US012567926B2

(12) United States Patent
Huschke et al.

(10) Patent No.: US 12,567,926 B2
(45) Date of Patent: Mar. 3, 2026

(54) METHOD AND APPARATUS FOR ACKNOWLEDGEMENT IN MULTICAST

(71) Applicant: Telefonaktiebolaget LM Ericsson (publ), Stockholm (SE)

(72) Inventors: Jörg Huschke, Cologne (DE); Erik Stare, Sollentuna (SE); Florent Munier, Västra Frölunda (SE); Rui Fan, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 412 days.

(21) Appl. No.: 18/261,718

(22) PCT Filed: Jan. 17, 2022

(86) PCT No.: PCT/CN2022/072376
§ 371 (c)(1),
(2) Date: Jul. 17, 2023

(87) PCT Pub. No.: WO2022/156641
PCT Pub. Date: Jul. 28, 2022

(65) Prior Publication Data
US 2024/0106578 A1 Mar. 28, 2024

(30) Foreign Application Priority Data

Jan. 19, 2021 (WO) ................ PCT/CN2021/072595
Jan. 22, 2021 (WO) ................ PCT/CN2021/073379

(51) Int. Cl.
*H04L 1/1829* (2023.01)
(52) U.S. Cl.
CPC .................................. *H04L 1/1861* (2013.01)

(58) Field of Classification Search
CPC ... H04L 1/1861; H04L 1/1822; H04L 1/1854; H04L 1/1896; H04L 1/1671; H04L 1/1607; H04L 1/1812; H04L 1/1829; H04L 1/1867; H04L 5/0055
See application file for complete search history.

(56) References Cited

U.S. PATENT DOCUMENTS

2017/0063562 A1    3/2017  Cariou et al.

FOREIGN PATENT DOCUMENTS

CN          101621361 A      1/2010

OTHER PUBLICATIONS

3GPP, "3rd Generation Partnership Project; Technical Specification Group Radio Access Network; NR; Physical layer procedures for control (Release 16)", 3GPP TS 38.213 V16.4.0, Dec, 2020, 1-181.
(Continued)

*Primary Examiner* — Shawn D Miller
(74) *Attorney, Agent, or Firm* — Murphy, Bilak & Homiller, PLLC

(57) ABSTRACT

Various embodiments of the present disclosure provide method and apparatus for acknowledgement in multicast. A method performed by a terminal device, comprising: transmitting, to a network node, information about acknowledgement, based on a configuration of a resource for the information about acknowledgement. The resource is configured for a plurality of terminal devices including the terminal device, and for at least one Hybrid Automatic Repeat reQuest, HARQ, process. According to embodiments for the present disclosure, manner for acknowledgement in multicast is provided.

25 Claims, 15 Drawing Sheets

(56)  References Cited

OTHER PUBLICATIONS

Futurewei, "Improving reliability for MC/BC services", 3GPP TSG RAN WG1 #103-e, R1-2007557, e-Meeting, Oct. 26-Nov. 13, 2020, 1-6.

3GPP, "3rd Generation Partnership Project; Technical Specification Group Radio Access Network; NR; User Equipment (UE) radio transmission and reception; Part 1: Range 1 Standalone (Release 17)", 3GPP TS 38.101-1 V17.0.0, Dec. 2020, 488 pages.

3GPP, "3rd Generation Partnership Project; Technical Specification Group Radio Access Network; NR; User Equipment (UE) radio transmission and reception; Part 2: Range 2 Standalone (Release 17)", 3GPP TS 38.101-2 V17.0.0, Dec. 2020, 180 pages.

3Gpp, "3GPP TS 38.101-3 V17.0.0", 3rd Generation Partnership Project; Technical Specification Group Radio Access Network; NR; User Equipment (UE) radio transmission and reception; Part 3: Range 1 and Range 2 Interworking operation with other radios (Release 17), Dec. 2020, 1-667.

Dahlman, Erik , et al., "5G NR The Next Generation Wireless Access Technology", Academic Press, Elsevier Ltd., 2018, 232-235.

Apple Inc. , "Discussion on MBS reliability improvement for RRC_Connected UEs", 3GPP TSG RAN WG1 #104-e, R1-2101360, e-Meeting, Jan. 25-Feb. 5, 2021, 1-4.

Mediatek Inc. , "Discussion on HARQ operation for Nr Mbs reliable transmission", 3GPP Tsg Ran WG1 #103-e, R1-2008962, e-Meeting, October 26th - Nov. 13, 2020, 1-5.

Figures 4, 5:
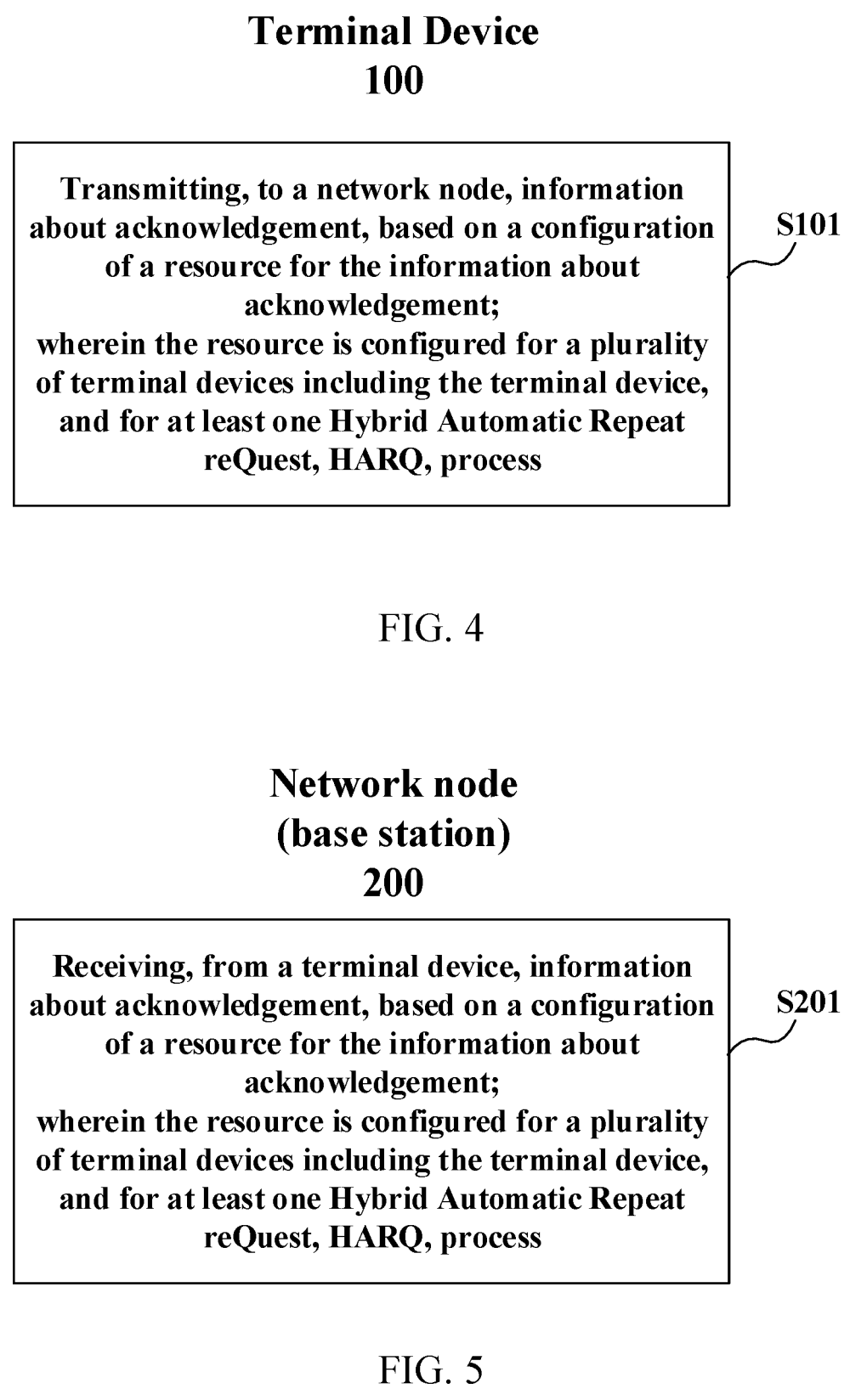

Terminal Device
100

Transmitting, to a network node, information about acknowledgement, based on a configuration of a resource for the information about acknowledgement;
wherein the resource is configured for a plurality of terminal devices including the terminal device, and for at least one Hybrid Automatic Repeat reQuest, HARQ, process

Network node
(base station)
200

Receiving, from a terminal device, information about acknowledgement, based on a configuration of a resource for the information about acknowledgement;
wherein the resource is configured for a plurality of terminal devices including the terminal device, and for at least one Hybrid Automatic Repeat reQuest, HARQ, process

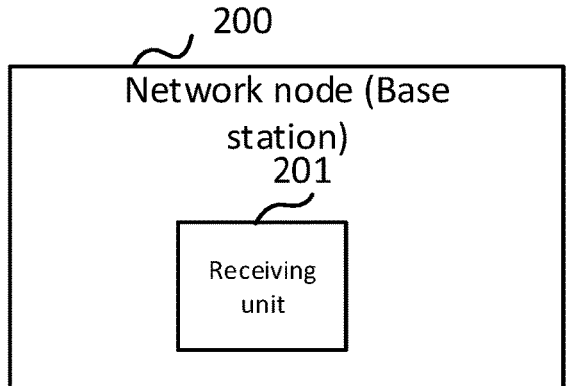
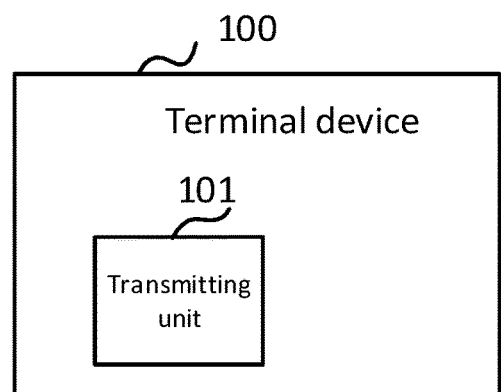
FIG. 8

Only 2-bit ACK/NACK 3-bit NACK

| TB1 | TB2 | TB3 | TB4 | | Codeword number |
|---|---|---|---|---|---|
| 0 | 0 | 0 | 1 | Assigned to PUCCH #0 | 0 |
| 0 | 0 | 1 | 0 | Assigned to PUCCH #1 | 1 |
| 0 | 0 | 1 | 1 | | 2 |
| 0 | 1 | 0 | 0 | Assigned to PUCCH #2 | 3 |
| 0 | 1 | 0 | 1 | | 4 |
| 0 | 1 | 1 | 0 | Assigned to PUCCH #3 | 5 |
| 0 | 1 | 1 | 1 | | 6 |
| 1 | 0 | 0 | 0 | Assigned to PUCCH #4 | 7 |
| 1 | 0 | 0 | 1 | | 8 |
| 1 | 0 | 1 | 0 | Assigned to PUCCH #5 | 9 |
| 1 | 0 | 1 | 1 | | 10 |
| 1 | 1 | 0 | 0 | Assigned to PUCCH #6 | 11 |
| 1 | 1 | 0 | 1 | | 12 |
| 1 | 1 | 1 | 0 | Assigned to PUCCH #7 | 13 |
| 1 | 1 | 1 | 1 | | 14 |

FIG. 17

| TB1 | TB2 | TB3 | TB4 | | Codeword number |
|---|---|---|---|---|---|
| 0 | 0 | 0 | 1 | Assigned to PUCCH #0 | 0 |
| 0 | 0 | 1 | 0 | | 1 |
| 0 | 0 | 1 | 1 | | 2 |
| 0 | 1 | 0 | 0 | Assigned to PUCCH #1 | 3 |
| 0 | 1 | 0 | 1 | | 4 |
| 0 | 1 | 1 | 0 | Assigned to PUCCH #2 | 5 |
| 0 | 1 | 1 | 1 | | 6 |
| 1 | 0 | 0 | 0 | Assigned to PUCCH #3 | 7 |
| 1 | 0 | 0 | 1 | | 8 |
| 1 | 0 | 1 | 0 | Assigned to PUCCH #4 | 9 |
| 1 | 0 | 1 | 1 | | 10 |
| 1 | 1 | 0 | 0 | Assigned to PUCCH #5 | 11 |
| 1 | 1 | 0 | 1 | | 12 |
| 1 | 1 | 1 | 0 | Assigned to PUCCH #6 | 13 |
| 1 | 1 | 1 | 1 | | 14 |

FIG. 18

| TB1 | TB2 | TB3 | TB4 | | Codeword number | Codeword weight |
|---|---|---|---|---|---|---|
| 0 | 0 | 0 | 1 | Assigned to PUCCH #0 | 0 | 1 |
| 0 | 0 | 1 | 0 | Assigned to PUCCH #1 | 1 | 1 |
| 0 | 1 | 0 | 0 | Assigned to PUCCH #2 | 2 | 1 |
| 1 | 0 | 0 | 0 | Assigned to PUCCH #3 | 3 | 1 |
| 0 | 0 | 1 | 1 | Assigned to PUCCH #4 | 4 | 2 |
| 0 | 1 | 1 | 0 | Assigned to PUCCH #5 | 5 | 2 |
| 1 | 1 | 0 | 0 | Assigned to PUCCH #6 | 6 | 2 |
| 1 | 0 | 0 | 1 | | 7 | 2 |
| 0 | 1 | 0 | 1 | | 8 | 2 |
| 1 | 0 | 1 | 0 | | 9 | 2 |
| 0 | 1 | 1 | 1 | | 10 | 3 |
| 1 | 0 | 1 | 1 | Assigned to PUCCH #7 | 11 | 3 |
| 1 | 1 | 0 | 1 | | 12 | 3 |
| 1 | 1 | 1 | 0 | | 13 | 3 |
| 1 | 1 | 1 | 1 | | 14 | 4 |

METHOD AND APPARATUS FOR ACKNOWLEDGEMENT IN MULTICAST

FIELD OF THE INVENTION

The present disclosure generally relates to communication technology, and more specifically, to method and apparatus for acknowledgement in multicast.

BACKGROUND

This section introduces aspects that may facilitate a better understanding of the disclosure. Accordingly, the statements of this section are to be read in this light and are not to be understood as admissions about what is in the prior art or what is not in the prior art.

For better communication quality, a reception device may transmit information about acknowledgement to the transmission device, about a received data or any other information. Thus, the transmission device may understand whether the data or any other information is received and decoded by the reception device.

However, in a multicast communication (one transmission device to multiple reception device), it is very hard for all the reception devices to transmit the information about acknowledgement to the transmission device.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Various embodiments of the present disclosure propose a solution for acknowledgement in multicast, particularly the transmission device may be aware of which data or other information needs to be retransmitted.

According to a first embodiment of the present disclosure a method performed by a terminal device is provided. The terminal device transmits information about acknowledgement to a network node. The transmitted information about acknowledgement is based on a configuration of a resource for the information about acknowledgement. The resource is configured for a plurality of terminal devices including the terminal device, and for at least one Hybrid Automatic Repeat reQuest, HARQ, process.

Further embodiments of the first embodiment are provided below.

The configuration may be received from the network node.

The configuration may indicate using of multiple Physical Uplink Control Channel, PUCCH, resources in a slot.

Each PUCCH resource of the multiple PUCCH resources may represent one HARQ process. The terminal device may transmit multiple NACK signals. One NACK signal on each PUCCH resource may correspond to a HARQ process for which the terminal has to signal a NACK.

The multiple PUCCH resources may include $M=2^N$ PUCCH resources for N HARQ processes, where M and N are positive integers. Each terminal device of the plurality of terminal devices may transmit on one of the PUCCH resources according to a subset of HARQ processes for which the terminal device needs to signal NACK.

The multiple PUCCH resources may include $M=2^N-1$ PUCCH resources for N HARQ processes, where M and N are positive integers. Each terminal device of the plurality of terminal devices may transmit on one of the PUCCH resources according to a subset of HARQ processes for which the terminal device needs to signal NACK. The terminal device may transmit on at least one PUCCH resource of the multiple PUCCH resources if the terminal device has at least one NACK, and the terminal device may not transmit on the multiple PUCCH resources if the terminal device does not have a NACK.

A HARQ codeword may comprise of at least Q bits for at least Q HARQ processes. Each of the bits may be associated to one HARQ process and each bit may indicate if a NACK for the associated HARQ process needs to be signaled.

The multiple PUCCH resources may include $2^N$ PUCCH resources for Q HARQ processes with Q>2 and Q>N, Q and N are positive integer values. HARQ codewords may be grouped so that $(2^Q/2^N)$ HARQ codewords are associated to each PUCCH resource except for one PUCCH resource. The terminal device may determine a HARQ codeword according to a subset of HARQ processes for which the terminal device needs to signal NACK. The terminal device may transmit on the PUCCH resource where the determined HARQ codeword is associated to. The HARQ codewords of one group may differs by up to Q-N bit(s).

Alternatively, the multiple PUCCH resources may include $2^N-1$ PUCCH resources for the Q HARQ processes with Q>N, Q and N are positive integer values. HARQ codewords may be grouped so that $(2^Q/2^N)$ HARQ codewords are associated to each PUCCH resource except for one PUCCH resource. The terminal device may determine a HARQ codeword according to a subset of HARQ processes for which the terminal device needs to signal NACK. The terminal device may transmit on the PUCCH resource where the determined HARQ codeword is associated to. The HARQ codewords of one group may differ by up to Q-N bit(s) with the exception of one group where the HARQ codewords may differ by up to Q-N+1 bit(s).

Alternatively, the multiple PUCCH resources may include $2^N$ PUCCH resources for the Q HARQ processes with Q>2 and Q>N, Q and N are positive integer values. Multiple HARQ codewords may be grouped and associated to a PUCCH resource based on the number of NACKs coded into the HARQ codeword. The terminal device may determine a HARQ codeword according to a subset of HARQ processes for which the terminal device needs to signal NACK. The terminal device may transmit on the PUCCH resource where the determined HARQ codeword is associated to. The number of HARQ codewords per group may increase with the number of NACKs coded into the HARQ codeword.

Alternatively the multiple PUCCH resources may include $2^N-Z$ PUCCH resources for Q HARQ processes with Q>N, $2^N-1>Z>0$, Q and N and Z are positive integer values. Multiple HARQ codewords may be grouped and associated to a PUCCH resource based on the number of NACKs coded into the HARQ codeword. The terminal device may determine a HARQ codeword according to a subset of HARQ processes for which the terminal device needs to signal NACK. The terminal device may transmit on the PUCCH resource where the determined HARQ codeword is associated to. The number of HARQ codewords per group may increase with the number of NACKs coded into the HARQ codeword.

The configuration may indicate using PUCCH format 0 phase rotations as a dimension in addition to OFDM-symbol and PRB.

Each rotation may be associated with a HARQ process.

A HARQ codeword may comprise of at least Q bits for at least Q HARQ processes. Each of the bits may be associated with one HARQ process and each bit may indicate if a NACK for the associated HARQ process needs to be signaled. Q may be an integer value being bigger than 1. Each HARQ codeword may be associated to one phase rotation.

Multiple HARQ codewords may be associated to the same phase rotation. The multiple HARQ codewords may be associated to the same phase rotation based on the number of NACKs coded into the HARQ codeword.

Alternatively, a maximum of one HARQ codeword may be associated to a phase rotation. HARQ codewords of adjacent phase rotations with associated HARQ codewords may differ only in one bit. Q may be bigger than two.

The configuration may indicate associating each NACK signal with a set of HARQ processes. The plurality of terminal devices may use the same PUCCH resource for the NACK-only signal relating to the same subset of HARQ processes.

A size of the subset may be 1.

The terminal device may transmit the NACK signal if at least one process of the associated subset of HARQ processes has a decoding failure.

According to a second Embodiment of the present disclosure a method performed by a network node is provided. The network node receives information about acknowledgement from a terminal device. The received information about acknowledgement is based on a configuration of a resource for the information about acknowledgement. The resource is configured for a plurality of terminal devices including the terminal device, and for at least one Hybrid Automatic Repeat reQuest, HARQ, process.

Further embodiments of the second embodiment are provided below.

The configuration may be transmitted to the plurality of terminal devices.

The configuration may indicate using of multiple Physical Uplink Control Channel, PUCCH, resources in a slot.

Each PUCCH resource of the multiple PUCCH resources may represent one HARQ process. The terminal device may transmit multiple NACK signals. One NACK signal on each PUCCH resource may correspond to a HARQ process for which the terminal has to signal a NACK.

The multiple PUCCH resources may include $M=2^N$ PUCCH resources for N HARQ processes, where M and N are positive integers. Each terminal device of the plurality of terminal devices may transmit on one of the PUCCH resources according to a subset of HARQ processes for which the terminal device needs to signal NACK.

The multiple PUCCH resources may include $M=2^N-1$ PUCCH resources for N HARQ processes, where M and N are positive integers. Each terminal device of the plurality of terminal devices may transmit on one of the PUCCH resources according to a subset of HARQ processes for which the terminal device needs to signal NACK. The terminal device may transmit on at least one PUCCH resource of the multiple PUCCH resources if the terminal device has at least one NACK, and the terminal device may not transmit on the multiple PUCCH resources if the terminal device does not have a NACK.

HARQ codeword may comprise of at least Q bits for at least Q HARQ processes. Each of the bits may be associated to one HARQ process. Each bit may indicate if a NACK for the associated HARQ process needs to be signaled.

The multiple PUCCH resources may include $2^N$ PUCCH resources for the Q HARQ processes with Q>2 and Q>N, Q and N are positive integer values. HARQ codewords may be grouped so that $(2^Q/2^N)$ HARQ codewords are associated to each PUCCH resource except for one PUCCH resource. The terminal device may determine a HARQ codeword according to a subset of HARQ processes for which the terminal device needs to signal NACK. The terminal device may transmit on the PUCCH resource where the determined HARQ codeword is associated to. The HARQ codewords of one group may differ by up to Q-N bit.

Alternatively, the multiple PUCCH resources may include $2^N-1$ PUCCH resources for the Q HARQ processes with Q>N, Q and N are positive integer values. HARQ codewords may be grouped so that $(2^Q/2^N)$ HARQ codewords are associated to each PUCCH resource except for one PUCCH resource. The terminal device may determine a HARQ codeword according to a subset of HARQ processes for which the terminal device needs to signal NACK. The terminal device may transmit on the PUCCH resource where the determined HARQ codeword is associated to. The HARQ codewords of one group may differ by up to Q-N bit with the exception of one group where the HARQ codewords may differ by up to Q-N+1 bit.

Alternatively, the multiple PUCCH resources may include $2^N$ PUCCH resources for the Q HARQ processes with Q>2 and Q>N, Q and N are positive integer values. Multiple HARQ codewords may be grouped and associated to a PUCCH resource based on the number of NACKs coded into the HARQ codeword. The terminal device may determine a HARQ codeword according to a subset of HARQ processes for which the terminal device needs to signal NACK. The terminal device may transmit on the PUCCH resource where the determined HARQ codeword is associated The number of HARQ codewords per group may increase with the number of NACKs coded into the HARQ codeword.

Alternatively, the multiple PUCCH resources may include $2^N-Z$ PUCCH resources for the Q HARQ processes with Q>N and $2^N-1>Z>0$, Q and N and Z are positive integer values. Multiple HARQ codewords may be grouped and associated to a PUCCH resource based on the number of NACKs coded into the HARQ codeword. The terminal device may determine a HARQ codeword according to a subset of HARQ processes for which the terminal device needs to signal NACK. The terminal device may transmit on the PUCCH resource where the determined HARQ codeword is associated to. The number of HARQ codewords per group may increase with the number of NACKs coded into the HARQ codeword.

The configuration may indicate using PUCCH format 0 phase rotations as a dimension in addition to OFDM-symbol and PRB.

Each rotation may be associated with a HARQ process.

A HARQ codeword may comprise of at least Q bits for at least Q HARQ processes. Each of the bits may be associated with one HARQ process. Each bit may indicate if a NACK for the associated HARQ process needs to be signaled. Q may be an integer value and may be greater than one. Each HARQ codeword may be associated to one phase rotation.

Multiple HARQ codewords may be associated to the same phase rotation. The multiple HARQ codewords may be associated to the same phase rotation based on the number of NACKs coded into the HARQ codeword.

Alternatively, maximum one HARQ codeword may be associated to a phase rotation. HARQ codewords of adjacent phase rotations with associated HARQ codewords may differ only in one bit. Q may be bigger than two.

The configuration may indicate associating each NACK signal with a set of HARQ processes. The plurality of terminal devices may use the same PUCCH resource for the NACK-only signal relating to the same subset of HARQ processes.

A size of the subset may be 1.

The terminal device may transmit the NACK signal if at least one process of the associated subset of HARQ processes has a decoding failure.

According to a third embodiment of the present disclosure a terminal device is provided. The terminal device 100 comprises one or more processors 1001 and one or more memories 1002 comprising computer program codes 1003. The one or more memories and the computer program codes are configured to, with the one or more processors, cause the terminal device at least to perform the method according to any of the first embodiments.

According to a fourth embodiment of the present disclosure a network node 200 is provided. The network node comprises one or more processors 2001 and one or more memories 2002 comprising computer program codes 2003. The one or more memories and the computer program codes are configured to, with the one or more processors, cause the network node at least to perform the method according to any of the second embodiments.

According to a fifth embodiment of the present disclosure a computer-readable medium 700 is provided. The computer readable medium having computer program codes 701 embodied thereon for use with a terminal device 100. The computer program codes comprise codes for performing the method according to any of the first embodiments.

According to a sixth embodiment of the present disclosure a computer-readable medium (700) is provided. The computer readable medium having computer program codes 701 embodied thereon for use with a network node 200. The computer program codes comprise codes for performing the method according to any of the second embodiments.

According to an aspect of the present disclosure, there is provided a method implemented in a communication system which may include a host computer, a network node and a UE. The network node may be a base station as referred in the following paragraphs. The UE may represent the terminal device of the first and third embodiments.

The method may comprise providing user data at the host computer. Optionally, the method may comprise, at the host computer, initiating a transmission carrying the user data to the UE via a cellular network comprising the base station which may perform any step of the method according to above embodiments of the present disclosure.

According to an aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the above embodiments of the present disclosure.

According to an aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the above embodiments of the present disclosure.

According to an aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the above embodiments of the present disclosure.

According to an aspect of the present disclosure, there is provided a method implemented in a communication system which may include a host computer, a base station and a UE. The method may comprise, at the host computer, receiving user data transmitted to the base station from the UE which may perform any step of the method according to the above embodiments of the present disclosure.

According to an aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the above embodiments of the present disclosure.

According to an aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the above embodiments of the present disclosure.

According to an aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the above embodiments of the present disclosure.

According to any of the embodiments of the present disclosure, a manner for acknowledgement in multicast is provided. Particularly, group-UEs are enabled to indicate NACK signals for multiple HARQ processes in the same uplink slot.

BRIEF DESCRIPTION OF THE DRAWINGS

The disclosure itself, the preferable mode of use and further objectives are best understood by reference to the following detailed description of the embodiments when read in conjunction with the accompanying drawings, in which:

FIG. 4 is a flow chart showing a method performed by a terminal device, according to embodiments of the present disclosure.

FIG. 5 is a flow chart showing a method performed by a network node, according to embodiments of the present disclosure.

FIG. 8 is a block diagram illustrating apparatuses for the network node, terminal device, according to some embodiments of the present disclosure.

FIG. 17 is an example table of 15 HARQ codewords mapped to 8 PUCCH resources.

FIG. 18 is another example table of 15 HARQ codewords mapped to 7 PUCCH resources.

FIG. 19 is another example table of 15 HARQ codewords mapped to 8 PUCCH resources.

DETAILED DESCRIPTION

Figure 1:
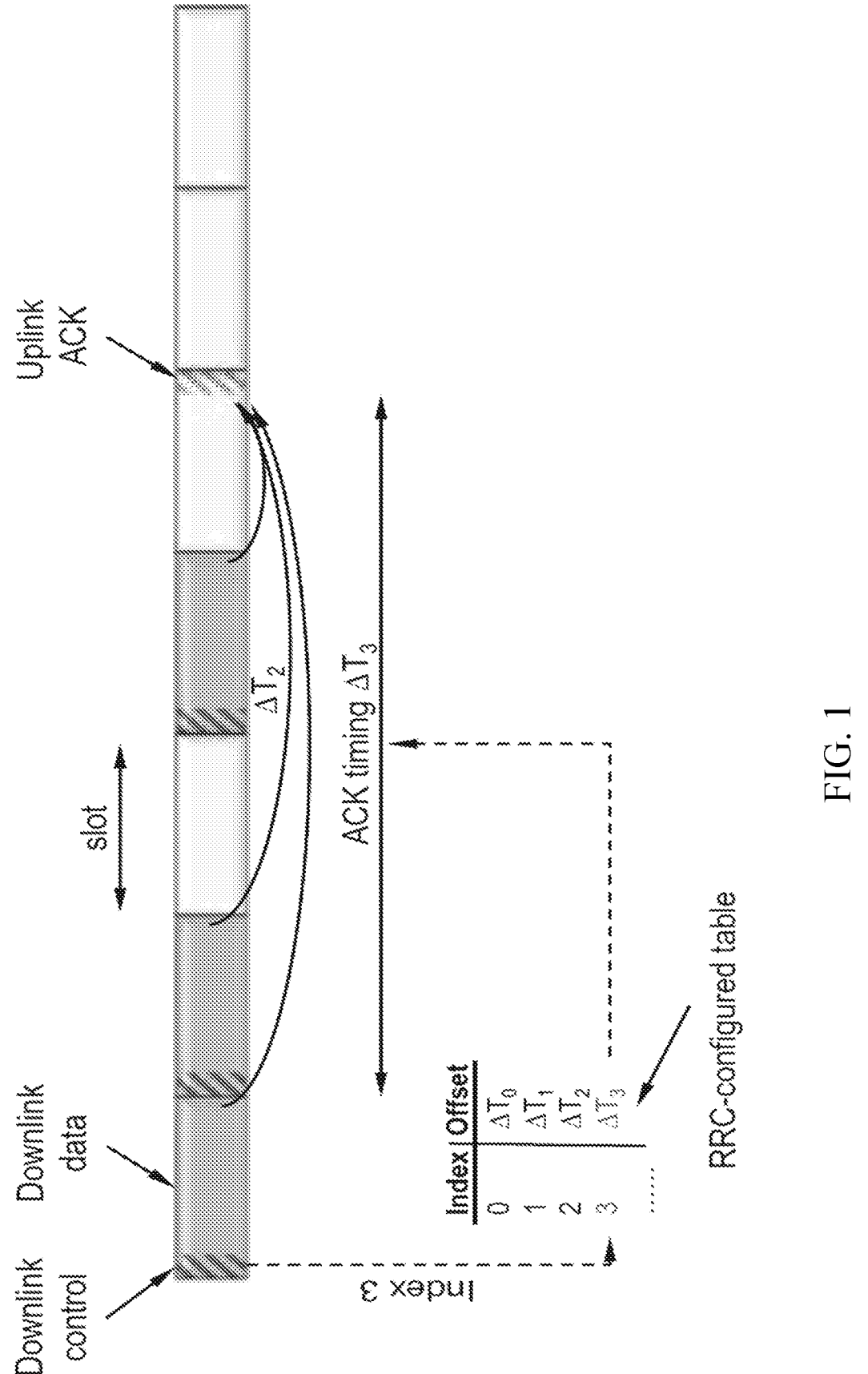
FIG. 1 is a diagram showing an example for configuring HARQ feedback timing.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

The term "phase rotation" is referred in the art also as "cyclic shift".

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As an implementation example without limitation, $3^{rd}$ generation partnership project New Radio (3GPP NR) illustrated below.

In NR, an adaptive retransmission scheme called Hybrid Automatic Repeat reQuest (HARQ) is widely used. According to this scheme the receiver of a packet sends back a positive (ACK) or a negative (NACK) acknowledgement to the sender, depending on whether the receiver has decoded the transport block successfully or unsuccessfully, respectively. If it is an ACK the sender will transmit a new transport block and if it is a NACK the sender will retransmit either the same version or a different version of the initial transport block. There can be multiple retransmission attempts for a single data transport block. Typically, the HARQ is most suitable for unicast and groupcast transmissions because these casting modes often have some ways of identifying the source and the destination of a transport block (e.g. source and destination identifiers, IDs), which facilitates both the feedbacks and data retransmissions. Currently, HARQ is often not used in broadcast mode where either feedback and retransmission are not of interest or their benefits cannot outweigh the associated complexity due to many participants.

Therefore, improvement is needed for implementing the retransmission for retransmission in multicast.

As an example without limitation, multicast in the downlink from a gNB to a group of UEs is illustrated below. The term multicast and Point-To-Multipoint (PTM) are used interchangeably.

FIG. 1 is a diagram showing an example for configuring HARQ feedback timing.

The actual time-frequency resource that a UE shall use for HARQ feedback is determined as outlined in the following.

In the DCI, a PDSCH-to-HARQ feedback timing indicator is contained that points to an element of an RRC-configurable list of timing for given PDSCH to the DL ACK (see 3GPP technical specification, TS 38.213 V16.4.0, clause 9.1.2) contained in Information Element (IE) dl-DataToUL-ACK as in illustrated in FIG. 1. The unit of the timings is a slot.

Figure 2:
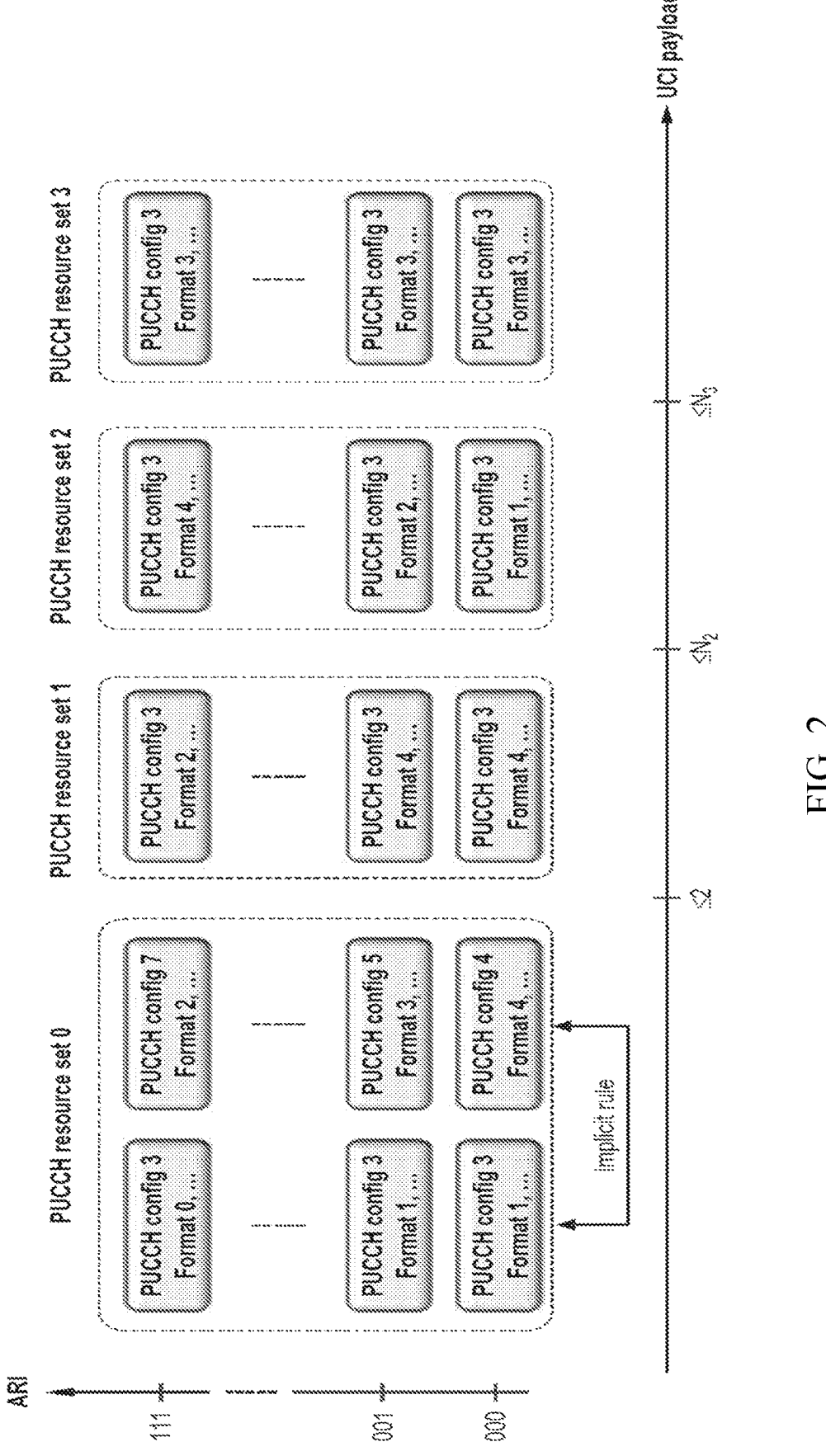
FIG. 2 is a diagram showing an example for feedback in PUCCH.

FIG. 2 is a diagram showing an example for feedback in PUCCH.

Within so defined slots in FIG. 1, the time-frequency-code resource in terms of OFDM-symbols, PRBs and possibly an orthogonal code is determined by a combination of the 3 bit PUCCH Resource Indicator PRI in the DCI and RRC-configured PUCCH resources sets, as illustrated in the FIG. 2, where ARI (Acknowledgement Resource Indicator) is stands for the standardized PRI.

Which resource set is used is determined from the UCI payload information in #bits as indicated by the x-axis.

A PUCCH resource set contains at least four PUCCH resource configurations, where each resource configuration contains the PUCCH format to use and all the parameters necessary for that format. The same PUCCH config may also appear for different formats.

The PUCCH configurations can be regarded as candidates for a UE, and the gNB can dynamically address the candidates in each DCI. This is advantageous as not all UEs are always scheduled, so for every uplink slot the gNB can dynamically assign a PUCCH config for those UEs that have actually a need, e.g. because the gNB has scheduled, using the DCI, data on the PDSCH before and the UE therefore are required to transmit A/N (ACK/NACK).

PUCCH format 0 occupies one OFDM symbol and one physical resource block (PRB) as shown in the subsequent figure.

Figure 3:
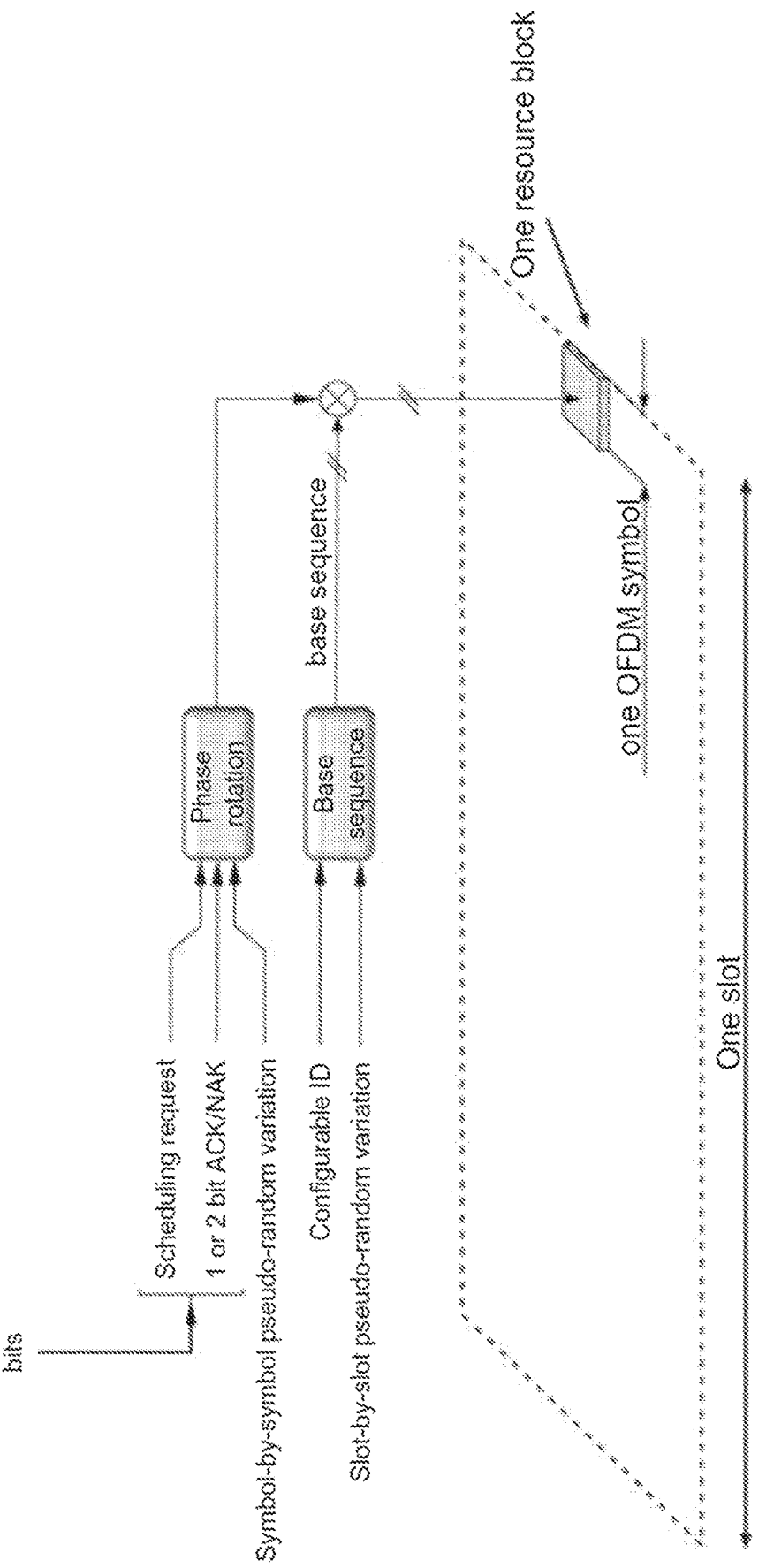
FIG. 3 is a diagram showing an example for including an ACK/NACK bit in one resource block.

FIG. 3 is a diagram showing an example for including a ACK/NACK bit in one resource block.

The transmitted sequence is generated by different phase rotations of the same underlying length-12 base sequence. Thus, the phase rotation applied to the base sequence carries the information. In other words, the information selects one of several phase-rotated sequences. Twelve different phase rotations are defined for the same base sequence, providing up to 12 different orthogonal sequences from each base sequence.

In NR Rel-17 the PTM transmission to a group of UEs is being standardized. It is agreed that group UEs may use NACK-only signaling for HARQ processes where decoding has failed, i.e. they will transmit only NACK but not ACK. If the UE needs to transmit NACK for only one HARQ process in an uplink slot, then all UEs having the need are assumed to transmit their NACK signal in the same PUCCH resource. The gNB will monitor the PUCCH resource but will not be able to discern which UE has transmitted NACK. If the detect energy received exceeds a configured threshold then the gNB assumes at least one UE has transmitted NACK and accordingly the gNB will retransmit the transport block associated with the HARQ process.

The gNB may instruct the group UEs to signal NACK for a set of HARQ processes in the same uplink slot, e.g. for all HARQ processes for which the gNB has transmitted a transport block since over a number of downlink slots and component carriers.

However, a current UE supports transmitting on only one PUCCH resource in a slot. The information the UE has to transmit, e.g. A/N from multiple HARQ processes, is gathered and constitutes the UCI payload. A PUCCH format is chosen that fits the UCI payload, as shown in a figure in the previous section. The gathered information is jointly encoded and transmitted in the PUCCH format, filling one PUCCH resource.

For the NACK-only signaling foreseen for PTM in Rel-17, it is desired that all UEs can use the same set of PUCCH resources and the signals transmitted from different UEs for NACK-indication are not orthogonal. Since different UEs may have to indicate NACK for different subsets of HARQ processes, an representation must be so that indications for different HARQ processes do not interfere with each other.

Embodiments of the present disclosure provide solutions with improvements.

Various embodiments of the present disclosure propose a solution for acknowledgement in multicast, particularly the transmission device may be aware of which data or other information needs to be retransmitted.

FIG. 4 is a flow chart showing a method performed by a terminal device, according to embodiments of the present disclosure.

According to an embodiment 1 of the present disclosure, there is provided a method performed by a terminal device, comprising:

transmitting S101, to a network node, information about acknowledgement, based on a configuration of a resource for the information about acknowledgement;

wherein the resource is configured for a plurality of terminal devices including the terminal device, and for at least one Hybrid Automatic Repeat reQuest, HARQ, process.

As an example, the information about acknowledgement may include at least one NACK (negative acknowledgement).

Embodiment 2, the method according to embodiment 1, wherein the configuration is received from the network node.

Embodiment 3, the method according to any of embodiments 1 to 2, wherein the configuration indicates using multiple Physical Uplink Control Channel, PUCCH, resources in a slot.

Embodiment 4, the method according to embodiment 3, wherein the multiple PUCCH resources include M=2^N PUCCH resources for N HARQ processes, M, N are positive integers; and wherein each terminal device in the plurality of terminal devices transmits on one of the PUCCH resources according to a subset of HARQ processes for which the terminal device needs to signal NACK.

As an exemplary alternative embodiment of the present disclosure, the multiple PUCCH resources may include M=2^N-1 PUCCH resources for N HARQ processes, M, N are positive integers. Each terminal device in the plurality of terminal devices transmits on one of the PUCCH resources according to a subset of HARQ processes for which the terminal device needs to signal NACK. The terminal device transmits on at least one PUCCH resource of the multiple PUCCH resources if the terminal device has at least one NACK, and the terminal device does not transmit on the multiple PUCCH resources if the terminal device does not have a NACK.

Embodiment 5, the method according to embodiment 3, wherein each PUCCH resource of the multiple PUCCH resources represents one HARQ process and the terminal device transmits multiple NACK signals, one NACK signal on each PUCCH resource corresponding to a HARQ process for which the terminal device has to signal a NACK.

Embodiment 6, the method according to any of embodiments 1 to 5, wherein the configuration indicates using PUCCH format 0 phase rotations as a dimension in addition to OFDM-symbol and PRB.

Embodiment 7, the method according to embodiment 3, wherein each rotation is associated with a HARQ process.

Embodiment 8, the method according to any of embodiments 1 to 7, wherein the configuration indicates associating each NACK signal with a set of HARQ processes, and wherein the plurality of terminal devices uses the same PUCCH resource for the NACK-only signal relating to the same subset of HARQ processes.

Embodiment 9, the method according to embodiment 8, wherein a size of the subset is 1.

Embodiment 10, the method according to embodiment 8, wherein the terminal device transmits the NACK signal if at least one process of the associated subset of HARQ processes has a decoding failure.

FIG. 5 is a flow chart showing a method performed by a network node (e.g. a base station), according to embodiments of the present disclosure.

Embodiment 11: a method performed by a network node (the network node may be a base station), comprising:

receiving S201, from a terminal device, information about acknowledgement, based on a configuration of a resource for the information about acknowledgement;

wherein the resource is configured for a plurality of terminal devices including the terminal device, and for at least one Hybrid Automatic Repeat reQuest, HARQ, process.

Embodiment 12, the method according to embodiment 11, wherein the configuration is transmitted to the plurality of terminal devices.

Embodiment 13, the method according to any of embodiments 11 to 12, wherein the configuration indicates using multiple Physical Uplink Control Channel, PUCCH, resources in a slot.

Embodiment 14, the method according to embodiment 13, wherein the multiple PUCCH resources include M=2^N PUCCH resources for N HARQ processes, M, N are positive integers; and wherein each terminal device in the plurality of terminal devices transmits on one of the PUCCH resources according to a subset of HARQ processes for which the terminal device needs to signal NACK.

As an exemplary alternative embodiment of the present disclosure, the multiple PUCCH resources may include M=2^N-1 PUCCH resources for N HARQ processes, M, N are positive integers. Each terminal device in the plurality of terminal devices transmits on one of the PUCCH resources according to a subset of HARQ processes for which the terminal device needs to signal NACK. The terminal device transmits on at least one PUCCH resource of the multiple PUCCH resources if the terminal device has at least one NACK, and the terminal device does not transmit on the multiple PUCCH resources if the terminal device does not have a NACK.

Embodiment 15, the method according to embodiment 13, wherein each PUCCH resource of the multiple PUCCH resources represents one HARQ process and the terminal device transmits multiple NACK signals, one NACK signal on each PUCCH resource corresponding to a HARQ process for which the terminal device has to signal a NACK.

Embodiment 16, the method according to any of embodiments 11 to 15, wherein the configuration indicates using PUCCH format 0 phase rotations as a dimension in addition to OFDM-symbol and PRB.

Embodiment 17, the method according to embodiment 13, wherein each rotation is associated with a HARQ process.

Embodiment 18, the method according to any of embodiments 11 to 17, wherein the configuration indicates associating each NACK signal with a set of HARQ processes, and wherein the plurality of terminal devices uses the same PUCCH resource for the NACK-only signal relating to the same subset of HARQ processes.

Embodiment 19, the method according to embodiment 18, wherein a size of the subset is 1.

Embodiment 20, the method according to embodiment 18, wherein the terminal device transmits the NACK signal if at least one process of the associated subset of HARQ processes has a decoding failure.

Embodiment 21, a terminal device 100, comprising:
one or more processors 1001; and
one or more memories 1002 comprising computer program codes 1003,
the one or more memories and the computer program codes configured to, with the one or more processors, cause the terminal device at least to perform the method according to any of embodiments 1 to 10 and 25 to 36.

Embodiment 22, network node 200, comprising:
one or more processors 2001; and
one or more memories 2002 comprising computer program codes 2003,
the one or more memories and the computer program codes configured to, with the one or more processors, cause the network node at least to perform the method according to any of embodiments 11 to 20 and 37 to 48.

Embodiment 23, computer-readable medium 700 having computer program codes 701 embodied thereon for use with a network node 200, wherein the computer program codes comprise codes for performing the method according to any one of embodiments 11 to 20 and 37 to 48.

Embodiment 24, computer-readable medium 700 having computer program codes 701 embodied thereon for use with a terminal device 100, wherein the computer program codes comprise codes for performing the method according to any one of embodiments 1 to 10 and and 25 to 36.

Embodiment 25, the method according to embodiment 3, wherein a HARQ codeword may comprises of at least Q bits for at least Q HARQ processes, wherein each of the bits may be associated to one HARQ process and each bit indicates if a NACK for the associated HARQ process needs to be signaled, wherein the multiple PUCCH resources may include $2^N$ PUCCH resources for the Q HARQ processes with Q>2 and Q>N, Q and N are positive integer values, wherein possible HARQ codewords may be grouped so that $(2^Q/2^N)$ HARQ codewords are associated to each PUCCH resource except for one PUCCH resource, wherein the terminal device (100) may determine a HARQ codeword according to a subset of HARQ processes for which the terminal device (100) needs to signal NACK, and wherein the terminal device (100) may transmit on the PUCCH resource where the determined HARQ codeword is associated to.

Embodiment 26, the method according to embodiment 25, wherein the HARQ codewords of one group may differ by up to Q-N bit(s).

Embodiment 27, the method according to embodiment 3, wherein a HARQ codeword may comprise of at least Q bits for at least Q HARQ processes, wherein each of the bits may be associated to one HARQ process and each bit may indicate if a NACK for the associated HARQ process needs to be signaled, wherein the multiple PUCCH resources may include $2^N-1$ PUCCH resources for the Q HARQ processes with Q>N, Q and N are positive integer values, wherein HARQ codewords may be grouped so that $(2^Q/2^N)$ HARQ codewords are associated to each PUCCH resource except for one PUCCH resource, wherein the terminal device (100) may determine a HARQ codeword according to a subset of HARQ processes for which the terminal device (100) needs to signal NACK, and wherein the terminal device (100) may transmit on the PUCCH resource where the determined HARQ codeword is associated to.

Embodiment 28, the method according to embodiment 27, wherein the HARQ codewords of one group may differ by up to Q-N bit with the exception of one group where the HARQ codewords may differ by up to Q-N+1 bit.

Embodiment 29, the method according to embodiment 3, wherein a HARQ codeword may comprise of at least Q bits for at least Q HARQ processes, wherein each of the bits may be associated with one HARQ process and each bit may indicate if a NACK for the associated HARQ process needs to be signaled, wherein the multiple PUCCH resources may include $2^N$ PUCCH resources for the Q HARQ processes with Q>2 and Q>N, Q and N are positive integer values, wherein multiple HARQ codewords may be grouped and associated to a PUCCH resource based on the number of NACKs coded into the HARQ codeword; and wherein the terminal device (100) may determine a HARQ codeword according to a subset of HARQ processes for which the terminal device (100) needs to signal NACK; and wherein the terminal device (100) may transmit on the PUCCH resource where the determined HARQ codeword is associated to.

Embodiment 30, the method according to embodiment 3, wherein a HARQ codeword may comprise of at least Q bits for at least Q HARQ processes, wherein each of the bits may be associated with one HARQ process and each bit may indicate if a NACK for the associated HARQ process needs to be signaled, wherein the multiple PUCCH resources may include $2^N-Z$ PUCCH resources for the Q HARQ processes with Q>N, $2^N-1>Z>0$, Q and N and Z are positive integer values, wherein multiple HARQ codewords may be grouped and associated to a PUCCH resource based on the number of NACKs coded into the HARQ codeword, wherein the terminal device (100) may determine a HARQ codeword according to a subset of HARQ processes for which the terminal device (100) needs to signal NACK, and wherein the terminal device (100) may transmit on the PUCCH resource where the determined HARQ codeword is associated to.

Embodiment 31, the method according to embodiment 29 or 30, wherein the number of HARQ codewords per group may increase with the number of NACKs coded into the HARQ codeword.

Embodiment 32, the method according to embodiment 6, wherein a HARQ codeword may comprise of at least Q bits for at least Q HARQ processes, wherein each of the bits may be associated with one HARQ process and each bit may indicate if a NACK for the associated HARQ process needs to be signaled, wherein Q>1 and Q being an integer value; and wherein each HARQ codeword may be associated to one phase rotation.

Embodiment 33, the method according to embodiment 32, wherein multiple HARQ codewords may be associated to the same phase rotation.

Embodiment 34, the method according to embodiment 33, wherein the multiple HARQ codewords may be associated to the same phase rotation based on the number of NACKs coded into the HARQ codeword.

Embodiment 35, the method according to embodiment 32, wherein maximum one HARQ codeword may be associated to a phase rotation, and wherein HARQ codewords of adjacent phase rotations with associated HARQ codewords may differ only in one bit.

Embodiment 36, the method according to embodiment 35, wherein Q may be bigger than 2.

Embodiment 37, the method according to embodiment 13, wherein a HARQ codeword may comprises of at least Q bits for at least Q HARQ processes, wherein each of the bits may be associated to one HARQ process and each bit indicates if a NACK for the associated HARQ process needs to be signaled, wherein the multiple PUCCH resources may include $2^N$ PUCCH resources for the Q HARQ processes with Q>2 and Q>N, Q and N are positive integer values, wherein possible HARQ codewords may be grouped so that $(2^Q/2^N)$ HARQ codewords are associated to each PUCCH resource except for one PUCCH resource, wherein the terminal device (100) may determine a HARQ codeword according to a subset of HARQ processes for which the terminal device (100) needs to signal NACK; and wherein the terminal device (100) may transmit on the PUCCH resource where the determined HARQ codeword is associated to.

Embodiment 38, the method according to embodiment 37 wherein the HARQ codewords of one group may differ by up to Q-N bit(s).

Embodiment 39, the method according to embodiment 13, wherein a HARQ codeword may comprise of at least Q bits for at least Q HARQ processes, wherein each of the bits may be associated to one HARQ process and each bit may indicate if a NACK for the associated HARQ process needs to be signaled, wherein the multiple PUCCH resources may include $2^N-1$ PUCCH resources for the Q HARQ processes with Q>N, Q and N are positive integer values, wherein HARQ codewords may be grouped so that $(2^Q/2^N)$ HARQ codewords are associated to each PUCCH resource except for one PUCCH resource, wherein the terminal device (100) may determine a HARQ codeword according to a subset of HARQ processes for which the terminal device (100) needs to signal NACK, and wherein the terminal device (100) may transmit on the PUCCH resource where the determined HARQ codeword is associated to.

Embodiment 40, the method according to embodiment 39 wherein the HARQ codewords of one group may differ by up to Q-N bit with the exception of one group where the HARQ codewords may differ by up to Q-N+1 bit.

Embodiment 41, the method according to embodiment 13, wherein a HARQ codeword may comprise of at least Q bits for at least Q HARQ processes, wherein each of the bits may be associated with one HARQ process and each bit may indicate if a NACK for the associated HARQ process needs to be signaled, wherein the multiple PUCCH resources may include $2^N$ PUCCH resources for the Q HARQ processes with Q>2 and Q>N, Q and N are positive integer values, wherein multiple HARQ codewords may be grouped and associated to a PUCCH resource based on the number of NACKs coded into the HARQ codeword, wherein the terminal device (100) may determine a HARQ codeword according to a subset of HARQ processes for which the terminal device (100) needs to signal NACK, wherein the terminal device (100) may transmit on the PUCCH resource where the determined HARQ codeword is associated to.

Embodiment 42, the method according to embodiment 13, wherein a HARQ codeword may comprise of at least Q bits for at least Q HARQ processes, wherein each of the bits may be associated with one HARQ process and each bit may indicate if a NACK for the associated HARQ process needs to be signaled, wherein the multiple PUCCH resources may include $2^N-Z$ PUCCH resources for the Q HARQ processes with Q>N and $2^N-1>Z>0$, Q and N and Z are positive integer values, wherein multiple HARQ codewords may be grouped and associated to a PUCCH resource based on the number of NACKs coded into the HARQ codeword, wherein the terminal device (100) may determine a HARQ codeword according to a subset of HARQ processes for which the terminal device (100) needs to signal NACK, and wherein the terminal device (100) may transmit on the PUCCH resource where the determined HARQ codeword is associated to.

Embodiment 43, the method according to embodiment 41 or 42 wherein the number of HARQ codewords per group may increase with the number of NACKs coded into the HARQ codeword.

Embodiment 44, the method according to embodiment 16 wherein a HARQ codeword may comprise of at least Q bits for at least Q HARQ processes, wherein each of the bits may be associated with one HARQ process and each bit may indicate if a NACK for the associated HARQ process needs to be signaled, wherein Q>1 and Q being an integer value; and wherein each HARQ codeword may be associated to one phase rotation.

Embodiment 45, the method according to embodiment 44 wherein multiple HARQ codewords may be associated to the same phase rotation.

Embodiment 46, the method according to embodiment 45 wherein the multiple HARQ codewords may be associated to the same phase rotation based on the number of NACKs coded into the HARQ codeword.

Embodiment 47, the method according to embodiment 44 wherein maximum one HARQ codeword may be associated to a phase rotation; and wherein HARQ codewords of adjacent phase rotations with associated HARQ codewords may differ only in one bit.

Embodiment 48, the method according to embodiment 47 wherein Q may be bigger than 2.

In present disclosure, the solution may use an existing PUCCH format for transmitting NACK feedback signals for multiple PDSCHs from multiple UEs in a multicast group.

The following variants can be used, where the first 7 configurations are mutually exclusive, the other 2 configurations can be combined with either of the first 2 configuration.

Configuration 1, using multiple PUCCH resources in the same slot, $M=(2^N$ PUCCH resources for N HARQ processes, each UE transmits on one of the resources according to the subset of HARQ processes for which the UE needs to signal NACK); M, N are positive integers;

Configuration 2, using multiple PUCCH resources in the same slot, where each PUCCH resource represents one HARQ process and the UE needs to transmit multiple NACK signals, one on each PUCCH resource corresponding to a HARQ process for which the UE has to signal a NACK;

Configuration 3, using multiple PUCCH resources in the same slot, $M=2^N-1$ PUCCH resources for N HARQ processes, each UE transmits on one of the resources according to the subset of HARQ processes for which the UE needs to signal NACK), UE does not transmit a signal if it does not need to indicate any NACK. No PUCCH resource corresponding to the all-zero HARQ codeword is needed; M, N are positive integers.

Configuration 4, using multiple PUCCH resources in the same slot, $2^N$ PUCCH resources for Q HARQ processes with Q>2, Q>N, HARQ codewords are grouped so that $(2^Q/2^N)$ HARQ codewords are associated to each PUCCH resource except for one PUCCH resource, each UE transmits on one of the PUCCH resources according to the subset of HARQ processes for which the UE needs to signal NACK and the resulting HARQ codeword, HARQ codewords of one group may differ by up to Q-N bit(s); Q and N are positive integer values.

Configuration 5, using multiple PUCCH resources in the same slot, 2^N−1 PUCCH resources for Q HARQ processes with Q>N, HARQ codewords are grouped so that (2^Q/2^N) HARQ codewords are associated to each PUCCH resource except for one PUCCH resource, each UE transmits on one of the PUCCH resources according to the subset of HARQ processes for which the UE needs to signal NACK and the resulting HARQ codeword; Q and N are positive integer values, HARQ codewords of one group may differ by up to Q-N bit with the exception of one group where the HARQ codewords may differ by up to Q-N+1 bit.

Configuration 6, using multiple PUCCH resources in the same slot, 2^N PUCCH resources for Q HARQ processes with Q>2, Q>N, multiple HARQ codewords are grouped and associated to a PUCCH resource based on the number of NACKs coded into the HARQ codeword, each UE transmits on one of the PUCCH resources according to the subset of HARQ processes for which the UE needs to signal NACK and the resulting HARQ codeword, the number of HARQ codewords per group may increase with the number of NACKs coded into the HARQ codeword; Q and N are positive integer values.

Configuration 7, using multiple PUCCH resources in the same slot, 2^N−Z PUCCH resources for Q HARQ processes with Q>N, 2^N−1>Z>0, multiple HARQ codewords are grouped and associated to a PUCCH resource based on the number of NACKs coded into the HARQ codeword, each UE transmits on one of the PUCCH resources according to the subset of HARQ processes for which the UE needs to signal NACK and the resulting HARQ codeword, the number of HARQ codewords per group may increase with the number of NACKs coded into the HARQ codeword; Q and N and Z are positive integer values.

Configuration 8, using the PUCCH format 0 phase rotations as dimension in addition to OFDM-symbol and PRB, i.e., associate each rotation with a HARQ process;

Configuration 9, associating each NACK signal with a set of HARQ processes, where multiple UEs use the same PUCCH resource for the NACK-only signal relating to the same subset of HARQ processes, and the subset size may reduce to 1. A UE transmits the NACK signal if at least one process of the associated subset of HARQ processes has a decoding failure and the gNB accordingly retransmits the transport blocks of all HARQ processes.

According to embodiments of the present disclosure, group-UEs are enabled to indicate NACK signals for multiple HARQ processes in the same uplink slot.

Further detailed embodiments may be further illustrated below.

In one embodiment, the gNB configures M=2^N PUCCH format 0 resources in a slot where N equal to the number of HARQ processes that need to send feedback in one slot. Each UE regards a HARQ process as a bit in a binary (HARQ) codeword, where the bit is set if the UE needs to transmit a NACK for that process. The PRI determines the bit position in the codeword. The UE then uses the codeword to address one out of the M PUCCH resources and transmits a PUCCH format 0 NACK signal on that resource. The gNB performs energy detection on each of the M PUCCH resources to detect which codewords Wi of the M codewords (i is an index number of codeword) have been signaled by any of the UEs. The gNB combines the codewords Wi by the logical OR operator to obtain a single codeword W. Each set bit in the (HARQ) codeword indicates to the gNB that at least one UE has signaled a NACK for the corresponding process. The gNB may then retransmit the corresponding transport blocks.

For example, a codeword "101" may indicate that a first process/block and a third process/block need to be retransmitted, with each "1" indicating one specific process/block.

One specific situation of this embodiment is that if a UE does not need to indicate NACK for any HARQ process, this corresponds to a codeword of all-zero bits and the UE would transmit a PUCCH format 0 signal on the resource addressed by this codeword.

More specifically, the UE (terminal device) spends battery power on the signal and the aggregate power from all UEs transmitting on this resource can cause intra- and intercell interference. The gNB does not benefit from the signal on this resource, because if the gNB also detects energy on the other PUCCH resources it knows the corresponding transport blocks need to be retransmitted, and if it does not detect energy in any other PUCCH resource then the gNB needs to assume that no UE has indicated a NACK, regardless of the energy detected on the resource corresponding to the all-zero codeword.

A further improved solution to this problem is that the UE does not transmit a signal if it does not need to indicate any NACK. The PUCCH resource corresponding to the all-zero codeword will thereby not be used for transmission by any of the group-UEs and may be reused for other purpose, e.g. by a UE for transmitting a HARQ A/N signal for a PTP (point to point) link. In one embodiment the gNB does not configure this PUCCH resource to the group-UEs, i.e. the total number of configured PUCCH resources for the group-UEs is M=2^N−1. Further advantage of this improved solution will be that UE battery power is not wasted, intra- and inter-cell interference is reduced and one PUCCH resource is saved.

In a still further improved solution multiple codewords can be mapped to the same PUCCH resource (bundled) as shown in the example of FIGS. 17 to 19. This safes PUCCH resources, but may lead to unnecessary re-transmissions.

A HARQ codeword may comprise of at least Q bits for at least Q HARQ processes. Each of the bits may be associated to one HARQ process, and each bit may indicate if a NACK for the associated HARQ process needs to be signaled.

FIG. 17 shows one embodiment where for a given number Q of HARQ processes (each belonging to one transport block, TB) a number 2^N of PUCCH resources is reserved, where Q>2 and Q>N, both are positive integer numbers. The possible HARQ feedback codewords alternatives (e.g. 0011, 0010, etc.) are grouped (bundled) so that (2^Q/2^N) HARQ codewords (from here onwards referred as "codewords") are associated to each PUCCH resource except for one PUCCH resource (since transmitting of the 0000 codeword is not needed as explained above, the number of codewords is odd which results in one codeword group with one associated codeword less). One constraint for grouping codewords may be that the grouped codewords may differ by up to Q-N bit(s).

In the example shown in FIG. 17 four HARQ processes are assumed (Q=4) and 8 PUCCH resources are reserved (N=3). For the 4 HARQ processes 15 feedback codewords (number 0-14) are possible. Since only 8 PUCCH resources are available, 2^Q/2^N=16/8=2 codewords are associated (grouped/bundled) to one PUCCH resource, except for PUCCH #0 resource. In other words, the bundling size is 2 for 7 PUCCH resources and 1 for PUCCH #0 resource. A "1" in the codeword signifies a "NACK". All zero codeword is not sent. The 2 codewords associated to PUCCH #1-PUCCH #7 resource differ by Q-N=4−3=1 bit.

The terminal device will then determine a HARQ codeword according to the subset of HARQ processes for which it needs to signal NACK, and transmit on the PUCCH resource where the determined HARQ codeword is associated to. For example if the determined HARQ codeword is 0101, the terminal device will transmit on PUCCH #2 resource as shown in FIG. 17.

In another embodiment shown in FIG. 18 HARQ bundling follows another mapping where a PUCCH resource is saved compared to FIG. 17. This is achieved by, for a given number Q of HARQ processes a number 2^N−1 of PUCCH resources are reserved, where Q>N, both are positive integer numbers. The possible HARQ feedback codewords alternatives (e.g. 0011, 0010, etc.) are grouped (bundled) so that (2^Q/2^N) codewords are associated to each PUCCH resource except for one PUCCH resource. The codewords of one group may differ by up to Q-N bit with the exception of one group where the codewords may differ by up to Q-N+1 bit In the example shown in FIG. 18 the following parameters are used: Q=4 and N=3. 15 NACK codewords (0000 needs not to be coded) are associated to the PUCCH resources. 2^N−1=7 PUCCH resources are available. Bundling size is 2^Q/2^N=2 for 12 of the codewords (associated to PUCCH #1-#6) and 3 for 3 of the codewords (associated to PUCCH #0). A "1" in the codeword signifies a NACK. All zero codeword (0000) is not sent. The codewords of the groups mapped to PUCCH #1-#6 differ by Q-N=4−3=1 bit, while the codewords mapped to PUCCH #0 differ by up to Q-N+1=4−3+1=2 bits.

In still another embodiment HARQ bundling follows a mapping where codewords representing only few NACKs are mapped to different PUCCH resources, and codewords representing more NACKs are grouped and mapped to the same PUCCH resource. In other words, codewords may be associated to the PUCCH resources based on the number of NACKs coded into the HARQ codeword.

An example of such an embodiment is shown in FIG. 19 with the same parameters (Q=4 and N=3) as used for the example shown in FIG. 17.

In the example shown in FIG. 19 the HARQ feedback for the Q=4 HARQ processes is mapped to the 2^N PUCCH resources in such a way, that the first PUCCH #0-#6 resources are associated with the codewords representing maximum 2 NACKs (codeword weight of max. 2), while PUCCH #7 resource is associated with codewords representing 2 or more NACKs (codeword weight of 2 or higher). The all-zero codeword is not mapped to any PUCCH resource. The weight of a codeword is the number of "1" (NACKs) present in the codeword.

The motivation for the above embodiment is twofold;
1) It is assumed that codewords with small bit-sum (codeword weight) are more likely than codewords which large bit-sum. This is true for low correlation in TB (Transport Block) error probability, which is typical for bursty interference, or if the different TBs are transmitted on different carrier frequencies, as in carrier aggregation.
2) If the gNB (network node) detects a signal on PUCCH #7, then the expected behavior is to retransmit all 4 TBs, For the codewords 7 to 9 this represents 2 out of the 4 TBs, i.e. 50%, are retransmitted unnecessarily, which is a higher percentage than for the example shown in FIG. 17, where there can for a signal received on any PUCCH be at most 1 out of 4 TBs, i.e. 25%, retransmitted unnecessarily. For the codewords 10 to 13 in this embodiment, 1 out of 4 TBs, i.e. 25%, is retransmitted unnecessarily.

In one embodiment, the gNB configures N PUCCH format 0 resources in a slot. Each resources is associated with one HARQ process and can be addressed e.g. by the PRI in the PTM-DCI.

The UE transmits a PUCCH format 0 NACK signal on the resource if the corresponding HARQ process indicated PDSCH decoding failure. If the UE is configured with multiple PUCCH resources for NACK signals and has failed to decode in multiple HARQ processes then the UE needs to transmit multiple NACK signals in the same slot.

In one embodiment the multiple PUCCH resources in a slot may be preferably configured on different OFDM symbols, so that the UE does not need to share its total transmit power among multiple NACK signals.

With second priority multiple PUCCH resources may be configured on the same OFDM symbol, i.e. using multiple PRBs. In one embodiment multiple PUCCH resources are configured on adjacent PRBs. This has the advantage of causing less intermodulation problems in the UE transmitter chain. According to TS 38.101 V17.0.0 resource allocation for PUSCH using CP-OFDM has to be almost-contiguous in FR1 (frequency range 1), where almost means the gaps must be smaller than 25% of the PRB range including both gaps and allocated PRBs, and in FR2 (frequency range 2) the allocation for PUSCH has to be contiguous.

For PUSCH the allocated PRB are also actually used for transmission. Multiple PUCCH resources configured for possible NACK transmission are, however, in general not all used by a UE. Therefore, even if the PUCCH resources are configure adjacently, the PRBs used for transmission of NACK signals by a UE in a particular slot will in general not be contiguous or almost-contiguous.

If the intermodulation problem in the transmitter is of lower importance, then in one embodiment the PRBs are configured non-adjacent. This has the advantage that possible signal distortion problems in the gNB receiver that can lead to interference between PRBs has decreases impact. Such signal distortion may be caused by an excessively high level of the accumulation of the power received from the unknown number of group UEs transmitting a NACK signal on the same PUCCH resource.

In one embodiment the multiple phase and reference rotations of the sequence that constitutes the PUCCH format 0 signal are exploited for forming NACK signal. There are 12 different rotations that can be multiplexed in one PUCCH format 0 resource. The rotations may be regarded as an additional multiplexing domain, i.e. in addition to the OFDM symbol and PRB domain introduced in previous embodiments.

In Rel-15 at most 2 rotations are allocated for representing 2 HARQ ACK/NACK bits per UE and different rotations can be used by different UEs to transmit ACK/NACK bits on the same PUCCH OFDM-symbol and PRB. For PTM and NACK-only signalling, all 12 rotations can be configured for all group-UEs. A drawback is that the UE has to split its total power over the rotations it uses.

The gNB for each PUCCH OFDM-symbol and PRB performs correlation of the received signal with the 12 rotations of the base sequence and then performs energy detection separately on each of the 12 correlation signals to determine if at least one group-UE has transmitted a signal with the corresponding rotation.

The misdetection probability at the gNB (the network node) for adjacent rotations increases with the channel delay spread. A known practically solution to keep the misdetection probability below an acceptable level is to not use each of the rotations (i.e. the 12 rotations), but only every other rotation.

Another possible solution is to minimize the effect that a misdetection between adjacent rotations can have. This may be done as described in the following embodiment.

In one embodiment each codeword is mapped to a different rotation using "Gray" encoding, so that any 2 adjacent rotations correspond to 2 codewords that differ only in 1 bit.

Figure 15:
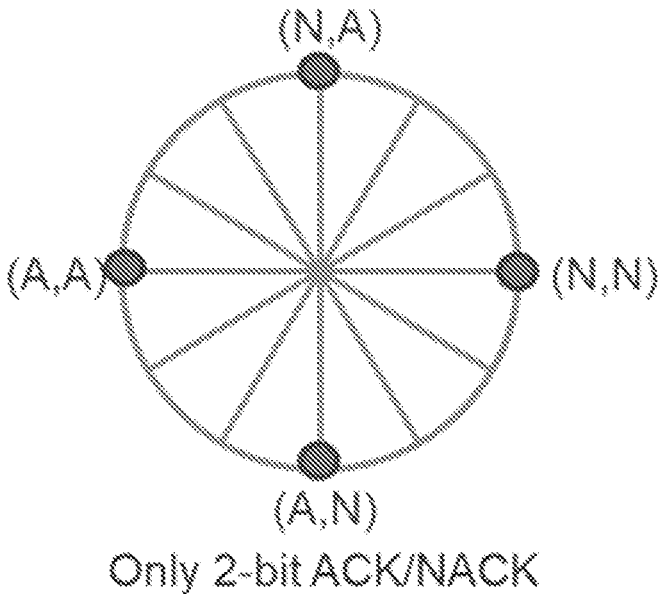
FIG. 15 is an example of a phase rotation diagram for a 2-bit ACK/NACK

FIG. 15 shows an example of a 2-bit codeword of a UE (terminal device) mapped to 4 different rotations following the Gray encoding. Each bit is represented by the values N for NACK (i.e. "1") or A for ACK (i.e. "0"). This scheme can be extended to codewords with more than 2 bits.

Figure 16:
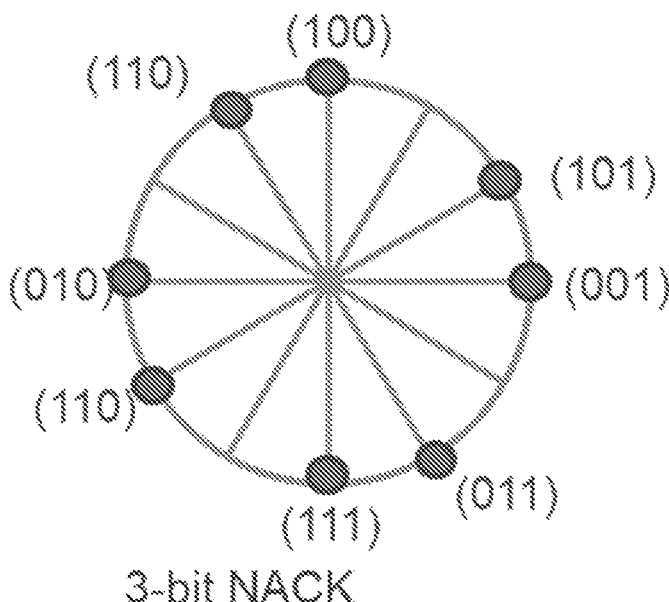
FIG. 16 is an example of a phase rotation diagram for a 3-bit NACK

FIG. 16 shows an embodiment with 12 rotations supporting log 2(12)=3 bit codewords. Different rotations can be configured to represent different decoding results for 3 HARQ processes. The decoding results of adjacent rotations only differ by one bit (Gray encoding).

If some codewords are mapped to the same rotation (not shown), even codewords with more than 3 bits can be supported when assuming for example 12 rotations in total. Multiple HARQ codewords may be associated to the same phase rotation based on the number of NACKs coded into the HARQ codeword.

In one embodiment, one PUCCH resource for format 0 is configured for multiple HARQ processes, and each UE transmits a NACK signal on the PUCCH resource if decoding failure in any of the HARQ processes has occurred. The gNB when receiving a NACK signal on the PUCCH resource will retransmit all transport blocks corresponding to the HARQ processes.

In a related embodiment, the total set of HARQ processes for which a transport block needs to be decoded and for which a UE must have the opportunity to indicate NACK to the UE is split into multiple subsets. For each subset the UE will transmit NACK if any decoding for any of the HARQ processes in the subset has failed. For each subset the gNB configures a PUCCH resource. The multiple PUCCH resources may be configured in a way in terms of OFDM symbol, PRB and rotation allocation as described in embodiments above.

According to such embodiments of the present disclosure, the problem of signaling NACK-only for a set of HARQ processes in one uplink slot may be solved, wherein multiple UEs use the same PUCCH resource for the NACK-only signal relating to the same subset of HARQ processes, and the subset size may reduce to 1 (namely, for each HARQ process).

Figure 6:
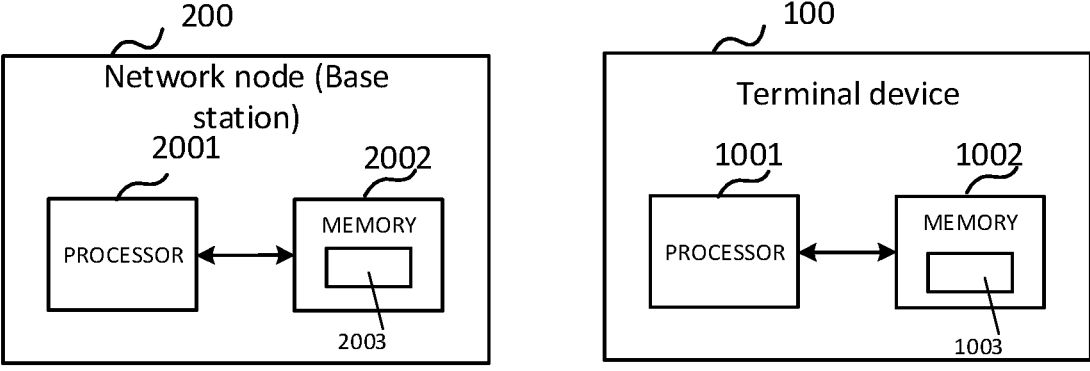
FIG. 6 is a block diagram illustrating apparatuses for a terminal device, a network node, according to embodiments of the present disclosure.

FIG. 6 is a block diagram illustrating apparatuses for a network node, a terminal device, according to embodiments of the present disclosure.

As shown in FIG. 6, a terminal device 100 may comprise: one or more processors 1001; and one or more memories 1002 comprising computer program codes 1003. The one or more memories and the computer program codes may be configured to, with the one or more processors, cause the terminal device at least to: perform the method according to any of embodiments above described.

A network node 200 may comprise: one or more processors 2001; and one or more memories 2002 comprising computer program codes 2003. The one or more memories and the computer program codes may be configured to, with the one or more processors, cause the network node at least to: perform the method according to any of embodiments above described.

The processors 1001, 2001, may be any kind of processing component, such as one or more microprocessor or microcontrollers, as well as other digital hardware, which may include digital signal processors (DSPs), special-purpose digital logic, and the like. The memories 1002, 2002 may be any kind of storage component, such as read-only memory (ROM), random-access memory, cache memory, flash memory devices, optical storage devices, etc.

Figure 7:
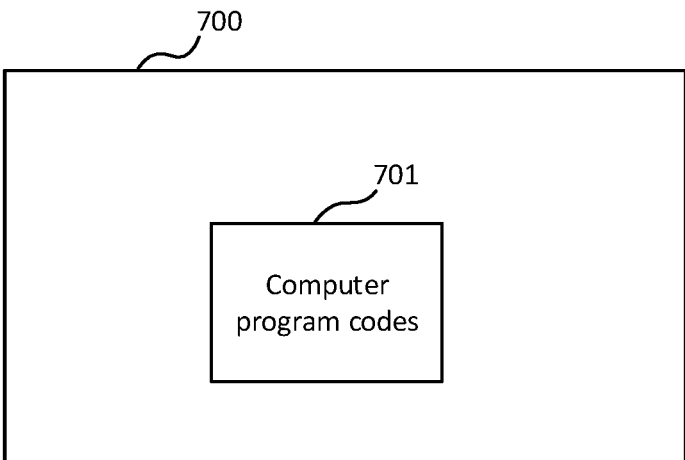
FIG. 7 is a block diagram illustrating a computer-readable medium according to some embodiments of the present disclosure.

FIG. 7 is a block diagram illustrating a computer-readable medium 700 according to some embodiments of the present disclosure.

As shown in FIG. 7, there is provided a computer-readable medium 700 having computer program codes 701 embodied thereon for use with one of a network node 200 and a terminal device 100. The computer program codes may comprise codes for performing the method according to any one of embodiments above described. The computer program codes 701 may include or correspond to these computer program codes 1003, 2003.

The computer readable storage medium 700 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

FIG. 8 is a block diagram illustrating apparatuses for the network node (e.g. a base station), terminal device, according to some embodiments of the present disclosure.

As shown in FIG. 8, there is provided a terminal device 100, comprising: a transmitting unit 101, configured to perform step S101.

In embodiments of the present disclosure, the terminal device may perform the method according to any of embodiments above described.

As shown in FIG. 8, there is provided a network node 200, comprising: a receiving unit 201, configured to perform step S201.

In embodiments of the present disclosure, the network node may perform the method according to any of embodiments above described.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With these units, the terminal device 100, the network node 200 may not need a fixed processor or memory, any computing resource and storage resource may be arranged from at least one network node/device/entity/apparatus in the communication system. The virtualization technology and network computing technology may be further introduced, so as to improve the usage efficiency of the network resources and the flexibility of the network.

According to any of the embodiments of the present disclosure, a manner for acknowledgement in multicast is provided. Particularly, group-UEs are enabled to indicate NACK signals for multiple HARQ processes in the same uplink slot.

These embodiments of the present disclosure may be implemented in a communication system.

For example, there is provided a method implemented in a communication system which may include a host computer, a network node and a UE. The network node may be the network node 200 of FIGS. 6 and 8 which may perform the method S201 of FIG. 5. The network node is referred in the following paragraphs as base station. The UE may be the terminal device 100 of FIGS. 6 and 8 which may perform the method S101 of FIG. 4.

The method may comprise providing user data at the host computer. Optionally, the method may comprise, at the host computer, initiating a transmission carrying the user data to the UE via a cellular network comprising the base station which may perform any step of the method according to above embodiments of the present disclosure.

For example, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the above embodiments of the present disclosure.

For example, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the above embodiments of the present disclosure.

For example, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the above embodiments of the present disclosure.

For example, there is provided a method implemented in a communication system which may include a host computer, a base station and a UE. The method may comprise, at the host computer, receiving user data transmitted to the base station from the UE which may perform any step of the method according to the above embodiments of the present disclosure.

For example, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the above embodiments of the present disclosure.

For example, there is provided a method implemented in a communication system which may include a host computer, a base station and a UE. The method may comprise, at the host computer, receiving, from the base station, user data originating from a transmission which the base station has received from the UE. The base station may perform any step of the method according to the above embodiments of the present disclosure.

For example, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the above embodiments of the present disclosure.

Figure 9:
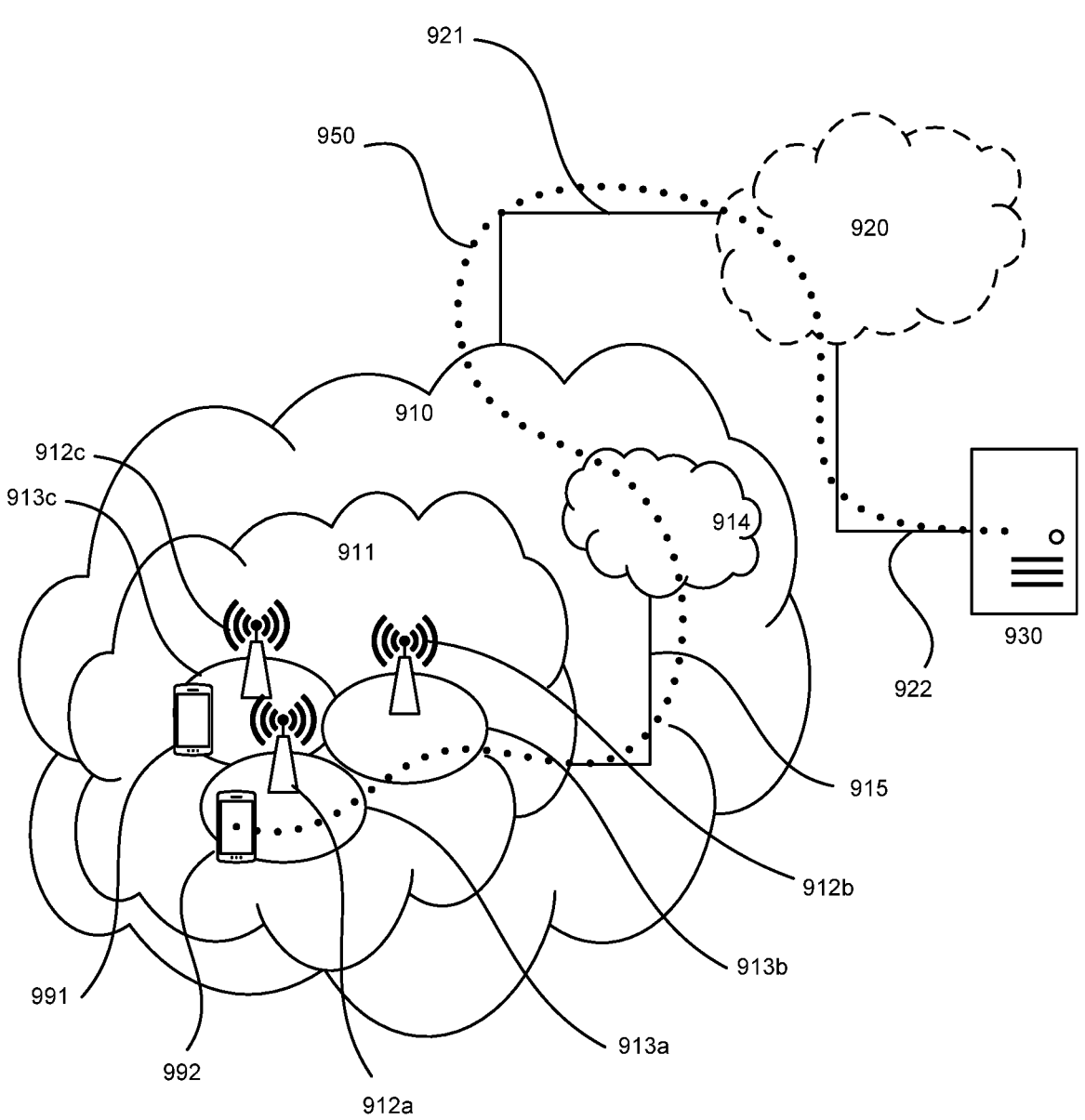
FIG. 9 is a block diagram illustrating a telecommunication network connected via an intermediate network to a host computer in accordance with some embodiments of the present disclosure.

FIG. 9 is a block diagram illustrating a telecommunication network connected via an intermediate network to a host computer in accordance with some embodiments of the present disclosure.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. Network node 200 of FIGS. 6 and 8 may represent a base station. A first UE 991 located in a coverage area 913c is configured to wirelessly connect to, or be paged by, the corresponding base station 912c. A second UE 992 in a coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912. Terminal device 100 of FIGS. 6 and 8 may represent a UE.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. Connections 921 and 922 between the telecommunication network 910 and the host computer 930 may extend directly from the core network 914 to the host computer 930 or may go via an optional intermediate network 920. An intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, the base station 912 may not or need not be informed about the past routing of an incoming downlink communication with data originating from the host computer 930 to be forwarded (e.g., handed over) to a connected UE 991. Similarly, the base station 912 need not be aware of the future routing of an outgoing uplink communication originating from the UE 991 towards the host computer 930.

Figure 10:
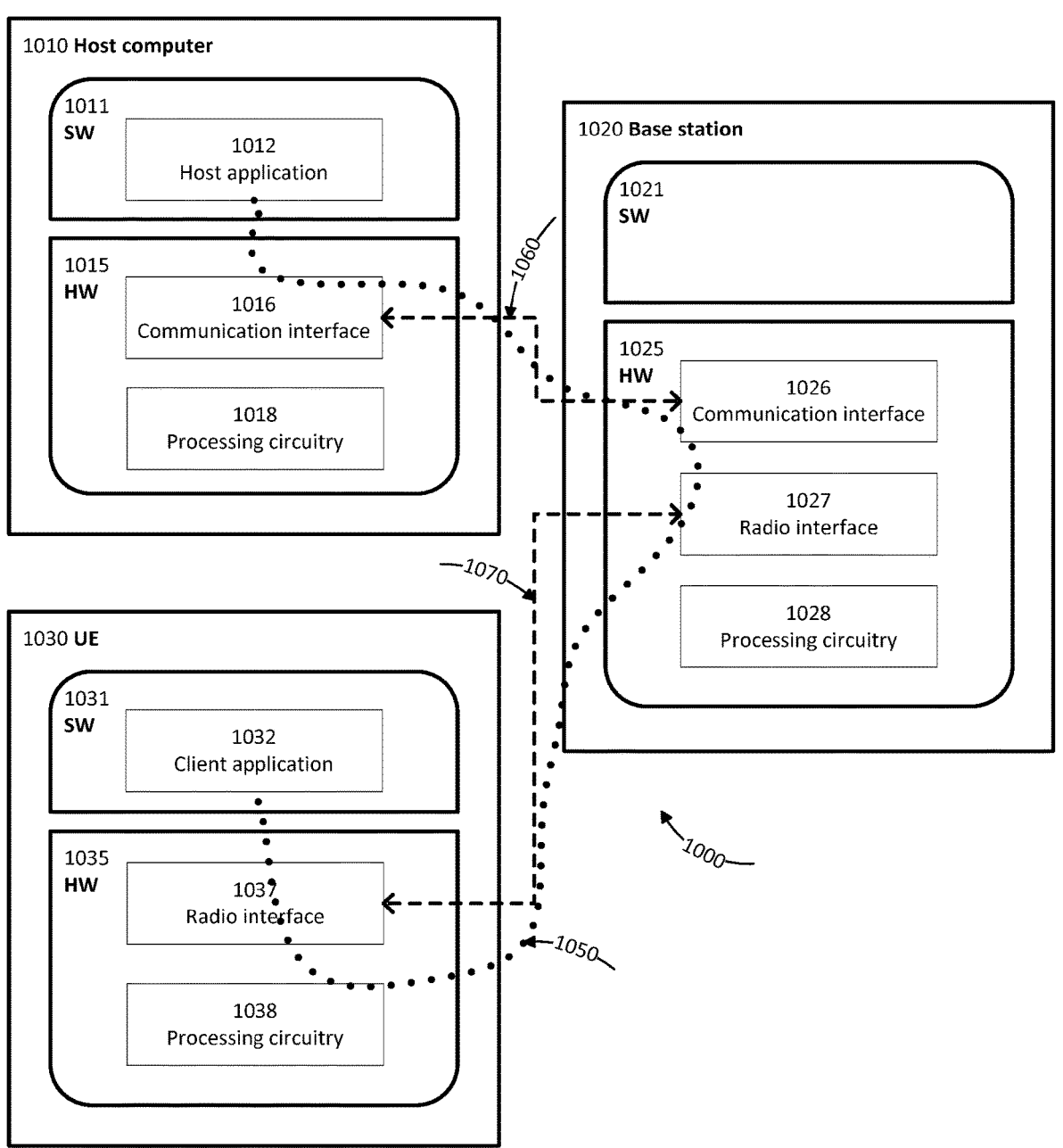
FIG. 10 is a block diagram illustrating a host computer communicating via a base station with a UE over a partially wireless connection in accordance with some embodiments of the present disclosure.

FIG. 10 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises a processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with the UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes a processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes a processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

It is noted that the host computer 1010, the base station 1020 and the UE 1030 illustrated in FIG. 10 may be similar or identical to the host computer 930, one of base stations 912*a*, 912*b*, 912*c* and one of UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

Wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1050 between the host computer 1010 and the UE 1030, in response to variations in the measurement results. The measurement procedure and/or the network functionality for reconfiguring the OTT connection 1050 may be implemented in software 1011 and hardware 1015 of the host computer 1010 or in software 1031 and hardware 1035 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which the software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer 1010's measurements of throughput, propagation times, latency and the like. The measurements may be implemented in that the software 1011 and 1031 causes messages to be transmitted, in particular empty or 'dummy' messages, using the OTT connection 1050 while it monitors propagation times, errors etc.

Figure 11:
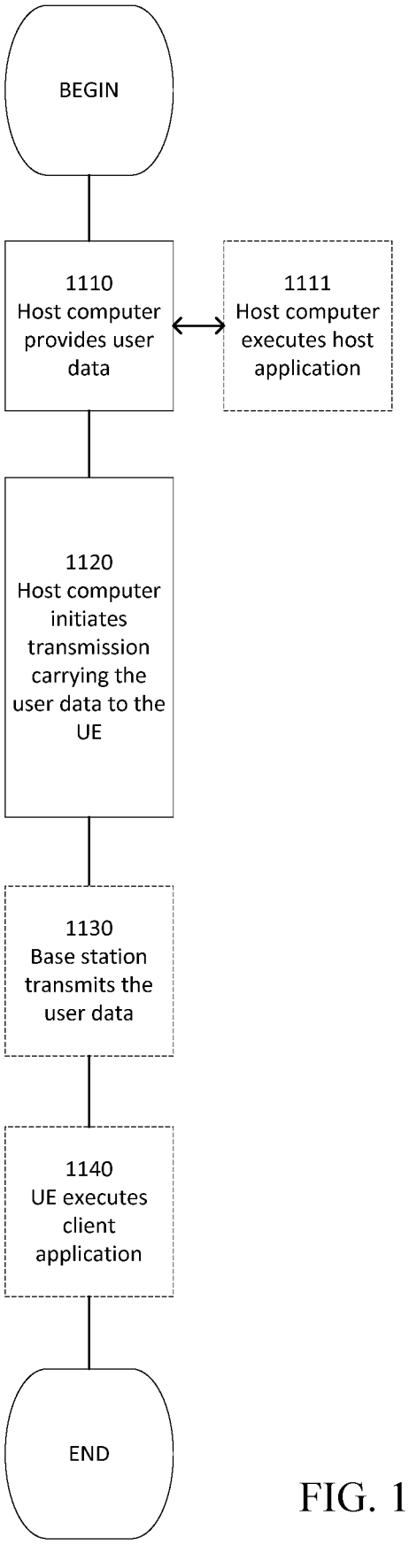
FIG. 11 is a flowchart illustrating a method implemented in a communication system, in accordance with an embodiment.

FIG. 11 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
FIG. 12 is a flowchart illustrating a method implemented in a communication system, in accordance with an embodiment.

FIG. 12 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
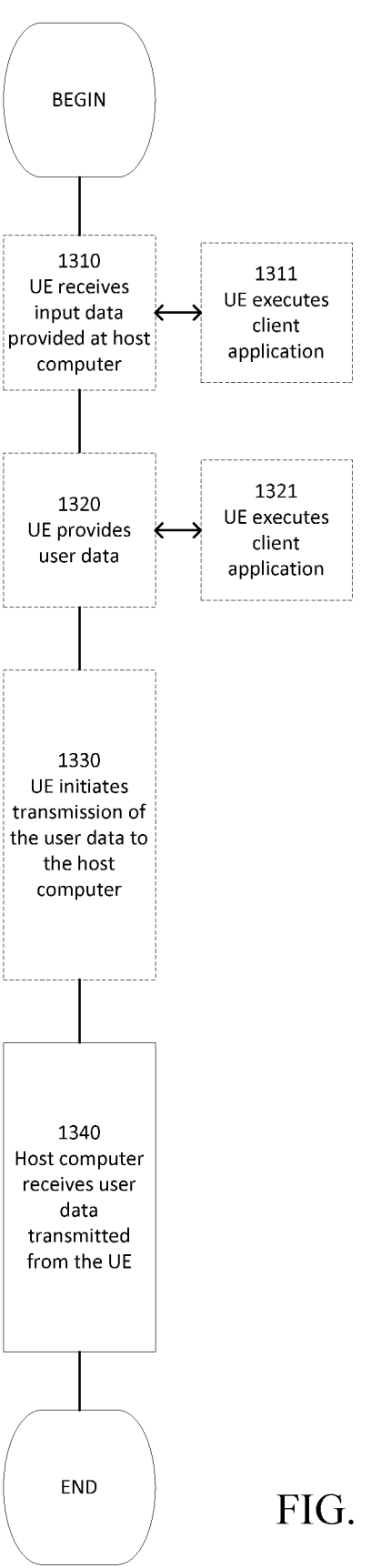
FIG. 13 is a flowchart illustrating a method implemented in a communication system, in accordance with an embodiment.

FIG. 13 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
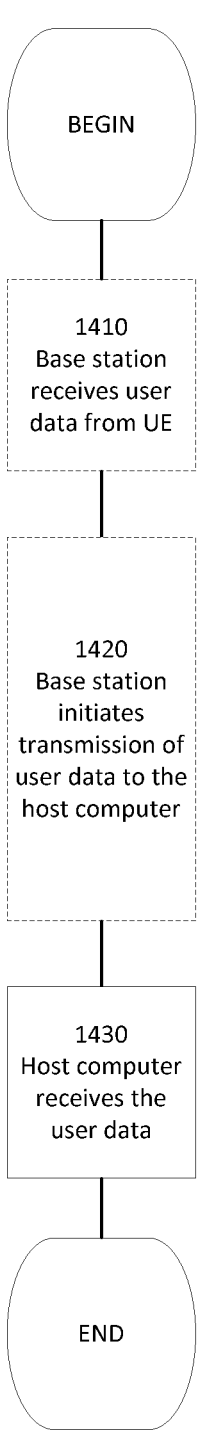
FIG. 14 is a flowchart illustrating a method implemented in a communication system, in accordance with an embodiment.

FIG. 14 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

Abbreviations Explanations

PRI PUCCH Resource Indicator
UCI Uplink Control Information

5G Fifth Generation
ACK Acknowledgment
AMF Access and Mobility Management Function
BWP Bandwidth Part
CE Control element
CP Cyclic Prefix
CSI-RS Channel State Information Reference Signal
DCI Downlink Control Information
DFN Direct Frame Number
DMRS Demodulation Reference Signal
gNB gNodeB
HARQ Hybrid Automatic Repeat Request
IE Information Element
LTE Long Term Evolution
MAC Media Access Control
MCS Modulation and Coding Scheme
NACK Negative Acknowledgement
NDI New Data Indicator
NR New Radio
OFDM Orthogonal Frequency-Division Multiplexing
PDCCH Physical Downlink Control Channel
PDCP Packet Data Convergence Protocol
PDSCH Physical Downlink Shared Channel
ProSe Proximity-based Services
PSBCH Physical Sidelink Broadcast Channel
PSCCH Physical Sidelink Common Control Channel
PSFCH Physical Sidelink Feedback Channel
PT-RS Tracking Reference Signal
PUCCH Physical Uplink Control Channel
PUSCH Physical Uplink Shared Channel
PTM Poimt To Multipoint
QoS Quality of Service
RAN Radio Access Network
RB Resource Block
RLC Radio Link Control
RLF Radio Link Failure
RLM Radio Link Monitoring
RNTI Radio Network Temporary Identifier
RRC Radio Resource Control
RSRP Reference Signal Received Power
RSRQ Reference Signal Received Quality
RSSI Received Signal Strength Indicator
RV Redundancy Version
SCI Sidelink Control Information
SCS Sub-Carrier Spacing
SI System Information
SL SideLink
SMF Session Management Function
S-PSS Sidelink Primary Synchronization Signal
SSB Synchronization Signal Block
SSID Sidelink Synchronization Identity
S-SSS Sidelink Secondary Synchronization Signal
TB Transport Block
UCI Uplink Control Information
UE User Equipment
UPF User Plane Function
QFI QoS Flow ID
RDI Reflective QoS flow to DRB mapping Indication
RQI Reflective QoS Indication
SDAP Service Data Adaptation Protocol
5QI 5G QoS Identifier
PQI PC5 5QI
IE Information Element

What is claimed is:
1. A method performed by a terminal device, the method comprising:

transmitting, to a network node, information about acknowledgement of one or more received transmissions, based on a configuration of a resource for the information; wherein the resource is configured for at least one Hybrid Automatic Repeat reQuest (HARQ) process;
wherein the configuration indicates the terminal device is to use multiple Physical Uplink Control Channel (PUCCH) resources in a slot for transmission of the information;
wherein the multiple PUCCH resources include $M=2^N-1$ PUCCH resources for N HARQ processes, where M and N are positive integers, and where N>1;
wherein transmitting the information comprises transmitting the information on one of the PUCCH resources according to a subset of HARQ processes for which the terminal device needs to signal negative acknowledgement (NACK); and
wherein, according to the configuration, the terminal device is to transmit the information on at least one PUCCH resource of the multiple PUCCH resources if the terminal device needs to signal at least one NACK, and the terminal device is not to transmit on any of the multiple PUCCH resources if the terminal device does not need to signal any NACK.
2. The method according to claim 1, further comprising receiving the configuration from the network node.
3. The method according to claim 1, wherein the configuration indicates the terminal device is to use PUCCH format 0 phase rotations as a dimension in addition to Orthogonal Frequency Division Multiplex (OFDM)-symbol and physical resource block (PRB).
4. The method according to claim 3, wherein each phase rotation is associated with a HARQ process.
5. The method according to claim 3, wherein a HARQ codeword comprises at least Q bits for at least Q HARQ processes, wherein each of the bits is associated with one HARQ process and each bit indicates if a NACK for the associated HARQ process needs to be signaled, wherein Q>1 and Q is an integer value, and wherein each HARQ codeword is associated to one phase rotation.
6. The method according to claim 3, wherein multiple HARQ codewords are associated to the same phase rotation.
7. The method according to claim 6, wherein the multiple HARQ codewords are associated to the same phase rotation based on a number of NACKs coded into the HARQ codeword.
8. The method according to claim 5, wherein a maximum of one HARQ codeword is associated to a phase rotation, and wherein HARQ codewords of adjacent phase rotations with associated HARQ codewords differ in one bit.
9. The method according to claim 8, wherein Q>2.
10. The method according to claim 1, wherein the configuration indicates the terminal device is to associate each NACK signal with a subset of HARQ processes, and wherein a plurality of terminal devices uses the same PUCCH resource for a NACK-only signal relating to the same subset of HARQ processes.
11. The method according to claim 10, wherein a size of the subset is 1.
12. The method according to claim 10, wherein, according to the configuration, the terminal device is to transmit the NACK-only signal if at least one process of the associated subset of HARQ processes has a decoding failure.
13. A terminal device, comprising:
one or more processors; and one or more memories comprising computer program codes, the one or more memories and the computer program codes configured to, with the one or more processors, cause the terminal device at least to:

transmit, to a network node, information about acknowledgement of one or more received transmissions, based on a configuration of a resource for the information;

wherein the resource is configured for at least one Hybrid Automatic Repeat reQuest (HARQ) process;

wherein the configuration indicates the terminal device is to use multiple Physical Uplink Control Channel (PUCCH) resources in a slot for transmission of the information; wherein the multiple PUCCH resources include M=2$^N$−1 PUCCH resources for N HARQ processes, where M and N are positive integers, and where N>1; and wherein the one or more memories and the computer program codes are configured to cause the terminal device to transmit the information on one of the PUCCH resources according to a subset of HARQ processes for which the terminal device needs to signal negative acknowledgement (NACK); and wherein, according to the configuration, the terminal device is to transmit the information on at least one PUCCH resource of the multiple PUCCH resources if the terminal device needs to signal at least one NACK, and the terminal device is not to transmit on any of the multiple PUCCH resources if the terminal device does not need to signal any NACK.

14. The terminal device according to claim 13, the one or more memories and the computer program codes further configured to, with the one or more processors, cause the terminal device to receive the configuration from the network node.

15. The terminal device according to claim 13, wherein the configuration indicates using PUCCH format 0 phase rotations as a dimension in addition to Orthogonal Frequency Division Multiplex (OFDM)-symbol and physical resource block (PRB).

16. The terminal device according to claim 15, wherein each phase rotation is associated with a HARQ process.

17. The terminal device according to claim 15, wherein a HARQ codeword comprises at least Q bits for at least Q HARQ processes, wherein each of the bits is associated with one HARQ process and each bit indicates if a NACK for the associated HARQ process needs to be signaled, wherein Q>1 and Q is an integer value, and wherein each HARQ codeword is associated to one phase rotation.

18. The terminal device according to claim 15, wherein multiple HARQ codewords are associated to the same phase rotation.

19. The terminal device according to claim 18, wherein the multiple HARQ codewords are associated to the same phase rotation based on a number of NACKs coded into the HARQ codeword.

20. The terminal device according to claim 17, wherein a maximum of one HARQ codeword is associated to a phase rotation, and wherein HARQ codewords of adjacent phase rotations with associated HARQ codewords differ in one bit.

21. The terminal device according to claim 20, wherein Q>2.

22. The terminal device according to claim 13, wherein the configuration indicates the terminal device is to associate each NACK signal with a subset of HARQ processes, and wherein a plurality of terminal devices uses the same PUCCH resource for a NACK-only signal relating to the same subset of HARQ processes.

23. The terminal device according to claim 22, wherein a size of the subset is 1.

24. The terminal device according to claim 22, wherein, according to the configuration, the terminal device is to transmit the NACK-only signal if at least one process of the associated subset of HARQ processes has a decoding failure.

25. A non-transitory computer-readable medium having computer program codes embodied thereon for use with a terminal device, wherein the computer program codes comprise codes for causing the terminal device to:

transmit, to a network node, information about acknowledgement of one or more received transmissions, based on a configuration of a resource for the information about acknowledgement;

wherein the resource is configured for at least one Hybrid Automatic Repeat reQuest (HARQ) process;

wherein the configuration indicates the terminal device is to use multiple Physical Uplink Control Channel (PUCCH) resources in a slot for transmission of the information; wherein the multiple PUCCH resources include M=2$^N$−1 PUCCH resources for N HARQ processes, where M and N are positive integers, and where N>1; and wherein the computer program codes comprise codes for causing the terminal device to transmit on one of the PUCCH resources according to a subset of HARQ processes for which the terminal device needs to signal negative acknowledgement (NACK); and wherein, according to the configuration, the terminal device is to transmit the information on at least one PUCCH resource of the multiple PUCCH resources if the terminal device needs to signal at least one NACK, and the terminal device is not to transmit on any of the multiple PUCCH resources if the terminal device does not need to signal any NACK.

* * * * *